US012518446B2

(12) United States Patent
Van Benthem

(10) Patent No.: US 12,518,446 B2
(45) Date of Patent: *Jan. 6, 2026

(54) RASTERISING ALIASED LINES

(71) Applicant: Imagination Technologies Limited, Kings Langley (GB)

(72) Inventor: Casper Van Benthem, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 191 days.

This patent is subject to a terminal disclaimer.

(21) Appl. No.: 18/222,930

(22) Filed: Jul. 17, 2023

(65) Prior Publication Data

US 2024/0005571 A1 Jan. 4, 2024

Related U.S. Application Data

(63) Continuation of application No. 17/744,649, filed on May 14, 2022, now Pat. No. 11,710,263, which is a
(Continued)

(30) Foreign Application Priority Data

Dec. 23, 2019 (GB) ..................... 1919153

(51) Int. Cl.
*G06T 11/20* (2006.01)
*G06T 1/20* (2006.01)

(52) U.S. Cl.
CPC .............. *G06T 11/203* (2013.01); *G06T 1/20* (2013.01)

(58) Field of Classification Search
CPC ........ G06T 1/20; G06T 11/203; G06T 15/005
(Continued)

(56) References Cited

U.S. PATENT DOCUMENTS

| 5,483,258 A | 1/1996 | Cornett et al. |
| 7,307,628 B1 | 12/2007 | Goodman et al. |

(Continued)

FOREIGN PATENT DOCUMENTS

| CN | 103608850 A | 2/2014 |
| CN | 108734624 A | 11/2018 |

OTHER PUBLICATIONS

Bandi et al., "Fast Computation of Spatial Selections and Joins Using Graphics Hardware," Information Systems, vol. 32, No. 8, Sep. 3, 2007, Elsevier B.V., pp. 1073-1100 (note: parent apn).
(Continued)

*Primary Examiner* — Jacinta M Crawford
(74) *Attorney, Agent, or Firm* — Potomac Law Group, PLLC; Vincent M DeLuca

(57) ABSTRACT

A method of rasterising a line in computer graphics determines whether the line's start and/or end is inside a diamond test area within the pixel. If the end is not inside and the start is inside, the pixel is drawn as part of the line. If neither the start nor the end of the line are inside, it is determined whether the line crosses more than one extended diamond edge and if so, it is further determined (i) whether an extended line passing through the start and end is substantially vertical and touches the right point of the diamond area, (ii) if the extended line touches the bottom point of the diamond area, and (iii) whether the extended line is on a same side of each point of the diamond area. If any of (i), (ii) and (iii) is positive, the pixel is drawn as part of the line.

18 Claims, 11 Drawing Sheets

Related U.S. Application Data continuation of application No. 17/132,299, filed on Dec. 23, 2020, now Pat. No. 11,354,835.

(58) Field of Classification Search
USPC .......................................................... 345/506
See application file for complete search history.

(56) References Cited

U.S. PATENT DOCUMENTS

| | | |
|---|---|---|
| 8,482,567 B1 | 7/2013 | Moreton et al. |
| 2003/0076325 A1 | 4/2003 | Thrasher |
| 2008/0198163 A1* | 8/2008 | Nakahashi ............ G06T 11/203 |
| | | 345/443 |
| 2009/0033678 A1 | 2/2009 | Case |
| 2009/0322759 A1* | 12/2009 | Nishikawa ............ G06T 11/203 |
| | | 345/443 |

OTHER PUBLICATIONS

Khalil, A.I.S., 'Proposed OpenGL GPU Architecture and Implementation of Line Rasterization Algorithm, M.S. Thesis, Cairo University. (Year: 2015) (note: parent apn).

OpenGL line segment rasterization specification', https://stackoverflow.com/questions/48012079/opengl-line-segment-rasterization-specification. (Year: 2017) (note: parent apn).

\* cited by examiner

FIG. 14
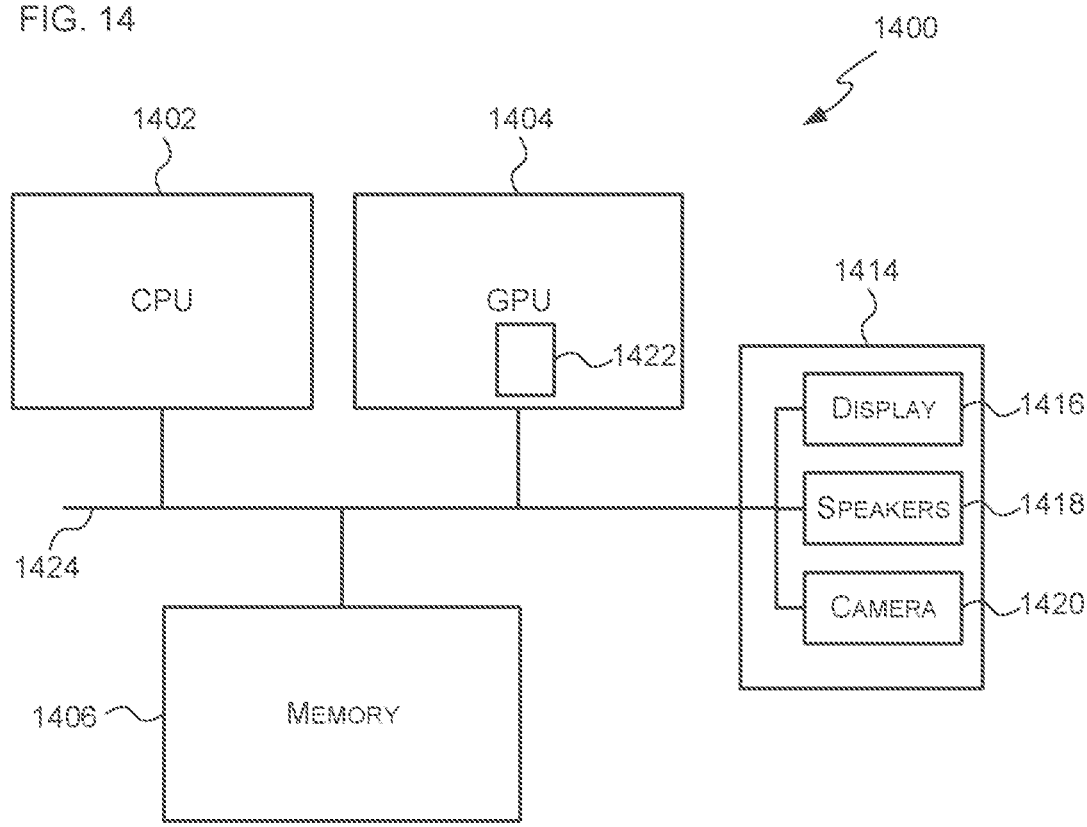
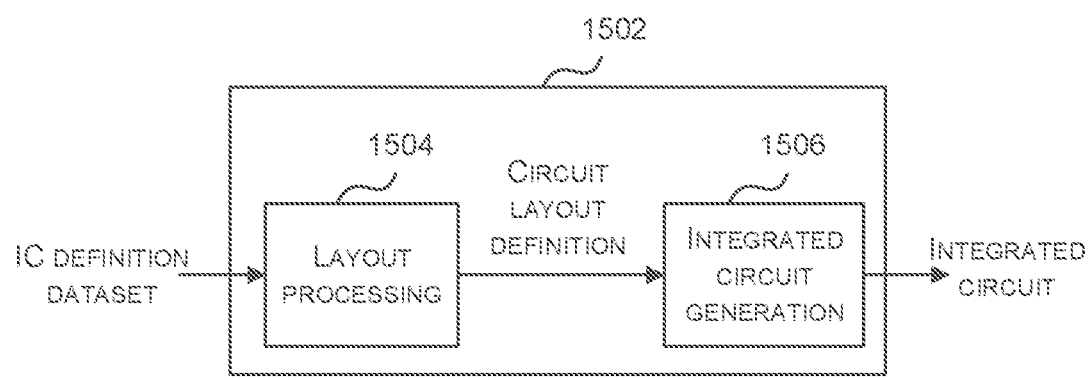
FIG. 15

RASTERISING ALIASED LINES

CROSS-REFERENCE TO RELATED APPLICATIONS AND CLAIM OF PRIORITY

This application is a continuation under 35 U.S.C. 120 of application Ser. No. 17/744,649 filed May 14, 2022, now U.S. Pat. No. 11,710,263, which is a continuation of prior application Ser. No. 17/132,299 filed Dec. 23, 2020, now U.S. Pat. No. 11,354,835, which claims foreign priority under 35 U.S.C. 119 from United Kingdom Application No. 1919153.5 filed Dec. 23, 2019, the contents of which are incorporated herein by reference in their entirety.

BACKGROUND

In computer graphics, a set of surfaces representing objects in a scene is divided up into a number of smaller and simpler pieces, (referred to as primitives), typically triangles, which are more amenable to rendering. The resulting divided surface is generally an approximation to the original surface, but the accuracy of this approximation can be improved by increasing the number of generated primitives, which in turn usually results in the primitives being smaller. The amount of sub-division is usually determined by a level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene and hence increases the size of the hardware that performs the processing. Furthermore, as the average triangle size reduces, aliasing (e.g. when angled lines appear jagged) occurs more often. To address this aliasing, multisampling (i.e. taking several samples per pixel) may be used. Alternatively, where multisampling is not used, line rasterization rules may be used to define how angled lines are handled and in particular to determine which pixels are used to render the line.

As the number of primitives that are generated increases, the ability of a graphics processing system to process the primitives becomes more important. One known way of improving the efficiency of a graphics processing system is to render an image in a tile-based manner. In this way, the rendering space into which primitives are to be rendered is divided into a plurality of tiles, which can then be rendered independently from each other. A tile-based graphics system includes a tiling unit to tile the primitives, i.e. to determine, for a primitive, which of the tiles of a rendering space the primitive is in. Then, when a rendering unit renders the tile, it can be given information (e.g. a per-tile list) indicating which primitives should be used to render the tile.

An alternative to tile-based rendering is immediate-mode rendering. In such systems there is no tiling unit generating per-tile lists and each primitive appears to be rendered immediately; however, even in such systems, the rendering space may still be divided into tiles of pixels and rendering of each primitive may still be done on a tile by tile basis with each pixel in a tile being processed before progressing to the next tile. This is done to improve locality of memory references.

The embodiments described below are provided by way of example only and are not limiting of implementations which solve any or all of the disadvantages of known graphics processing pipelines.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of rasterising a line comprises determining whether the line's start and/or end is inside a diamond test area within the pixel. If the end is not inside and the start is inside, the pixel is drawn as part of the line. If neither the start nor the end of the line are inside, it is determined whether the line crosses more than one extended diamond edge and if so, it is further determined (i) whether an extended line passing through the start and end is substantially vertical and touches the right point of the diamond area, (ii) if the extended line touches the bottom point of the diamond area, and (iii) whether the extended line is on a same side of each point of the diamond area. If any of (i), (ii) and (iii) is positive, the pixel is drawn as part of the line.

A first aspect provides a method of rasterising a line in a graphics processing pipeline, the line having a start point and an end point and the method comprising, for each pixel in an input set of pixels: determining whether the end point and/or the start point of the line is in a diamond test area within the pixel, wherein the diamond test area is defined by a top point, a left point, a bottom point and a right point connected by edges to form a diamond; in response to determining that the end point is not in the diamond test area and the start point of the line is in the diamond test area, adding the pixel to a set of pixels to be drawn as part of the line; in response to determining that neither the start point nor the end point of the line are in the diamond test area, determining if the line crosses more than one extended diamond edge, wherein an extended diamond edge is coincident with an edge of the diamond test area and extends beyond the diamond points that the edge connects; and in response to determining that the line crosses more than one extended diamond edge: determining if an extended line passing through the start and end point has a slope less than −1 or greater than +1 and touches the right point of the diamond test area; determining if the extended line touches the bottom point of the diamond test area; determining if the extended line is on a same side of each point of the diamond test area; and in response to determining that the extended line has a slope less than −1 or greater than +1 and touches the right point of the diamond test area or that the extended line touches the bottom point of the diamond test area or that the extended line is not on a same side of each point of the diamond test area, adding the pixel to a set of pixels to be drawn as part of the line.

A second aspect provides a graphics processing pipeline comprising a rasterization phase, the rasterization phase comprising hardware logic arranged to: determine whether the end point and/or the start point of the line is in a diamond test area within the pixel, wherein the diamond test area defined by a top point, a left point, a bottom point and a right point connected by edges to form a diamond; in response to determining that the end point is not in the diamond test area and the start point of the line is in the diamond test area, to add the pixel to a set of pixels to be drawn as part of the line; in response to determining that neither the start point nor the end point of the line are in the diamond test area, determine if the line crosses more than one extended diamond edge, wherein an extended diamond edge is coincident with an edge of the diamond test area and extends beyond the diamond points that the edge connects; and in response to determining that the line crosses more than one extended diamond edge: to determine if an extended line passing through the start and end point has a slope less than −1 or greater than +1 and touches the right point of the diamond test area; to determine if the extended line touches the bottom point of the diamond test area; to determine if the extended line is on a same side of each point of the diamond test area; and in response to determining that the extended line has a slope less than −1 or greater than +1 and touches the right point of the diamond test area or that the extended line touches the bottom point of the diamond test area or that the extended line is not on a same side of each point of the diamond test area, to add the pixel to a set of pixels to be drawn as part of the line.

The graphics processing pipeline may be embodied in hardware on an integrated circuit. There may be provided a method of manufacturing, at an integrated circuit manufacturing system, a graphics processing pipeline. There may be provided an integrated circuit definition dataset that, when processed in an integrated circuit manufacturing system, configures the system to manufacture a graphics processing pipeline. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing pipeline.

There may be provided an integrated circuit manufacturing system comprising: a non-transitory computer readable storage medium having stored thereon a computer readable integrated circuit description that describes the graphics processing pipeline; a layout processing system configured to process the integrated circuit description so as to generate a circuit layout description of an integrated circuit embodying the graphics processing pipeline; and an integrated circuit generation system configured to manufacture the graphics processing pipeline according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 14 shows a computer system in which a graphics processing system is implemented; and FIG. 15 shows an integrated circuit manufacturing system for generating an integrated circuit embodying a graphics processing system.

Figures 1A, 1B:
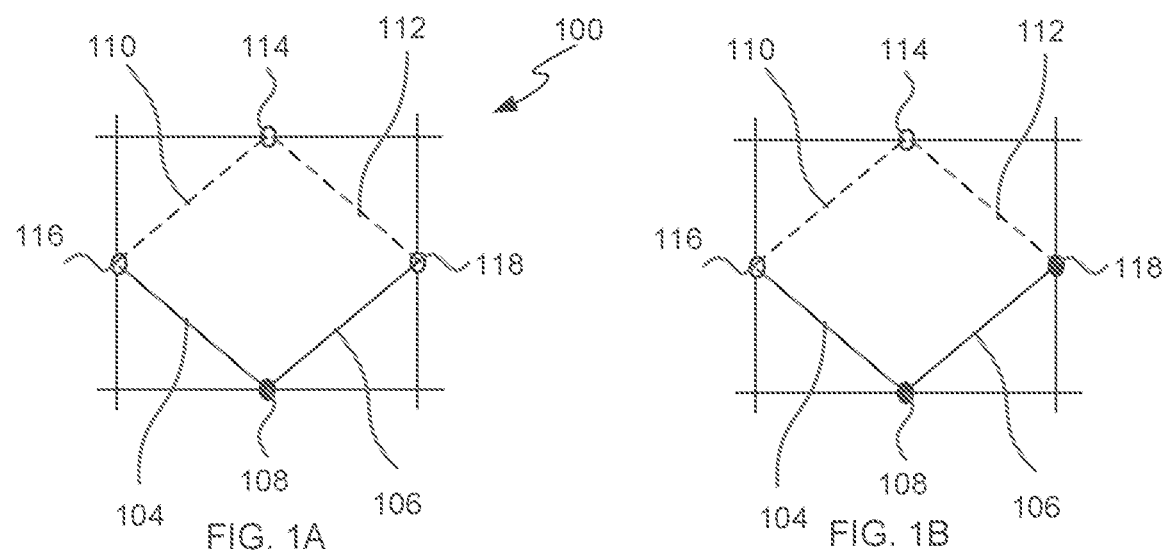
FIGS. 1A and 1B are schematic diagrams illustrating a diamond-shaped test area used in a line rasterization rule.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As mentioned above, when rendering lines (which may be edges of primitives or primitives themselves), line rasterization rules may be used to define how angled lines are handled and in particular to determine which pixels are used to render the line, i.e. which pixels are considered to be a visible part of the line and which pixels are not part of the line (and hence may be referred to as 'non-visible'). An example of a line rasterization rule may be referred to as the 'diamond exit rule' and this is defined in the Direct3D 11 graphics specification (as can be found at: https://docs.microsoft.com/en-us/windows/desktop/direct3d11/d3d10-graphics-programming-guide-rasterizer-stage-rules). The diamond exit rule is also used in other standards (e.g. OpenGL). This rule uses a diamond-shaped test area 102 within each pixel 100 (as shown in FIGS. 1A and 1B) to determine if a line covers a pixel and the same rule may be used for a line strip as it is drawn as a sequence of connected lines. According to the Direct3D 11 graphics specification, the diamond test area differs slightly dependent upon the gradient of the line, with x-major lines being defined as those lines with a slope that is in the range −1 to +1 inclusive (such that the line is horizontal or close to horizontal) and y-major lines being all other lines. For x-major lines, the diamond test area includes the lower-left edge 104, the lower-right edge 106 and bottom corner 108 but excludes the upper-left edge 110, the upper-right edge 112, the top corner 114, the left corner 116 and the right corner 118, as shown in FIG. 1A (with the excluded lines being shown by dotted lines and the excluded corners being shown as open, rather than black, circles). For y-major lines, the diamond test area additionally includes the right corner 118 (but still excludes the upper-left edge 110, the upper-right edge 112, the top corner 114 and the left corner 116), as shown in FIG. 1B.

Described herein is a method and hardware for rasterising aliased lines and which implements the diamond exit rule (e.g. of Direct3D 11) in an accurate manner (e.g. such that lines are not rendered as narrow parallelograms) and in an efficient manner, i.e. in terms of the amount of computation that is performed, the area of hardware (and in particular additional hardware specific to the diamond exit rule) that is required (and hence physical size) and power consumption. This hardware, which may be referred to as line rasterization hardware, may be implemented within the rasterization phase of a graphics processing pipeline (e.g. within a graphics processing unit, GPU).

In various examples, the method of rasterising an aliased line described herein may be implemented by reusing hardware that is also used for conservative rasterization (or other tasks involving edge testing) within a graphics processing pipeline. By reusing existing hardware, the overall hardware size is reduced compared to alternative methods that use dedicated hardware logic to implement the diamond exit rule. Additionally, by using the method described herein, aliased lines can be drawn in the same overall strategy/flow as triangle primitives without requiring high level architecture changes.

The methods described herein are compatible with graphics processing pipelines that are arranged to render in a rendering space that is sub-divided into a plurality of tiles, where each tile is sub-divided into a plurality of microtiles, and each microtile comprises an identical arrangement of pixels (this is shown graphically in FIG. 12, described below). Use of microtiles breaks up the tiles into segments that fully utilise the available computational logic (with empty microtiles being culled with a coarse edge test). In contrast, some known methods of implementing the diamond exit rule are not compatible with rasterising methods that use microtiles.

For the purposes of the following description, the diamond test area (which may be referred to simply as the 'test area') is as described above with reference to FIGS. 1A and 1B. Irrespective of the slope of the line, the test area includes the lower-left edge 104 and the lower-right edge 106 but not the upper-left edge 110 and the upper-right edge 112. The bottom corner 108 only is included in the test area for x-major lines and for y-major lines, both the bottom corner 108 and the right corner 118 are included within the test area.

Figure 2:
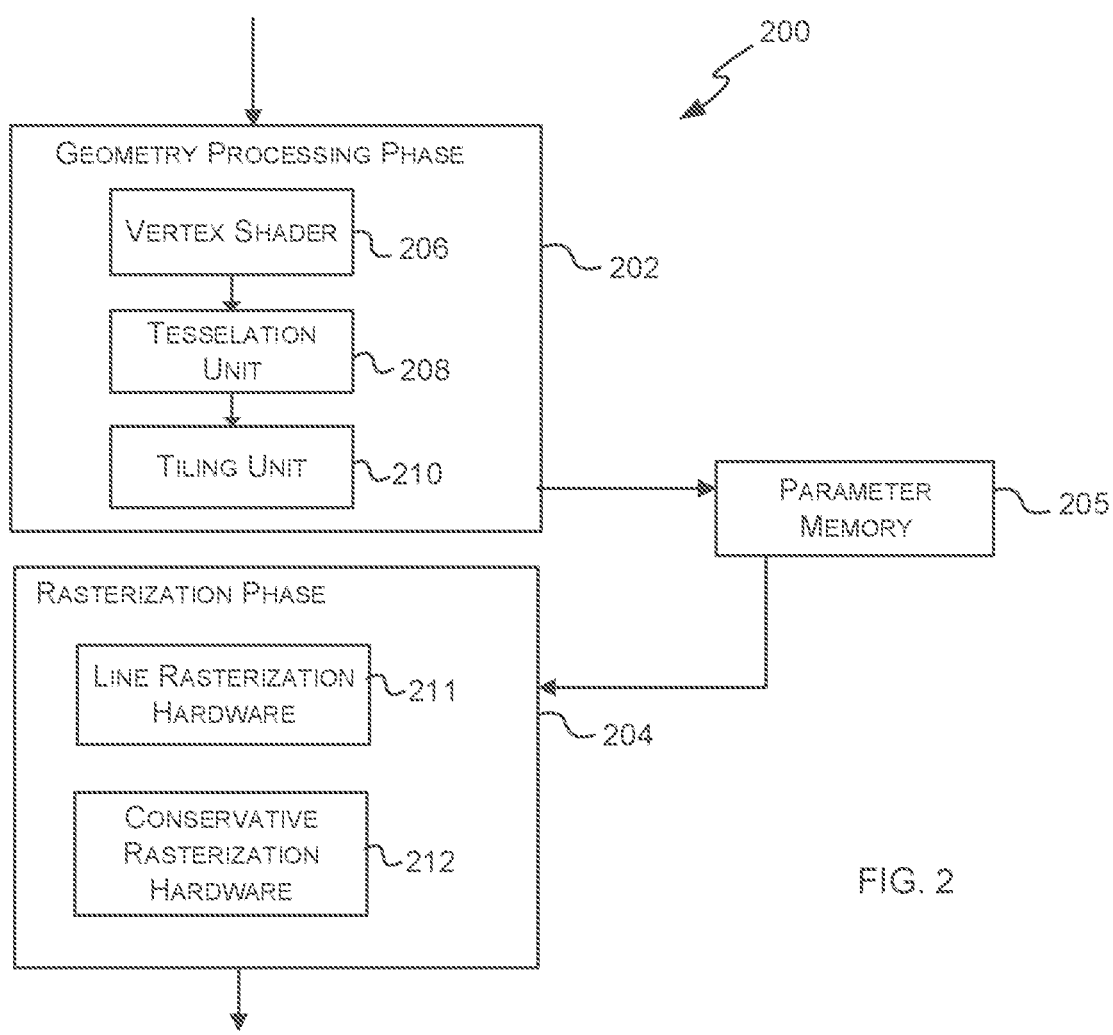
FIG. 2 is a schematic diagram of an example graphics processing unit (GPU) pipeline.

FIG. 2 is a schematic diagram of an example graphics processing unit (GPU) pipeline 200 which may be implemented in hardware within a GPU and which uses a tile-based rendering approach. The hardware described herein may also be used in a GPU that instead uses alternative rendering approaches where the rendering processes groups of pixels (e.g. where immediate mode rendering is used). As shown in FIG. 2, the pipeline 200 comprises a geometry processing phase 202 and a rasterization phase 204. Data generated by the geometry processing phase 202 may pass directly to the rasterization phase 204 and/or some of the data may be written to memory (e.g. parameter memory 205) by the geometry processing phase 202 and then read from memory by the rasterization phase 204.

The geometry processing phase 202 comprises a vertex shader 206, tessellation unit 208 and tiling unit 210. Between the vertex shader 206 and the tessellation unit (or tessellator) 208 there may be one or more optional hull shaders, not shown in FIG. 2. The geometry processing phase 202 may also comprise other elements not shown in FIG. 2, such as a memory and/or other elements. Where the GPU pipeline 200 is used for immediate mode rendering, the tiling unit 210 may be omitted and may be replaced by an alternative unit that groups pixels in some way in order to limit the number of pixels for which calculations are performed at any time.

The vertex shader 206 is responsible for performing per-vertex calculations. Unlike the vertex shader, the hardware tessellation unit 208 (and any optional hull shaders) operates per-patch and not per-vertex. The tessellation unit 208 outputs primitives and in systems which use vertex indexing, an output primitive may take the form of three vertex indices and a buffer of vertex data (e.g. for each vertex, a UV coordinate and in various examples, other parameters such as a displacement factor and optionally parent UV coordinates). Where indexing is not used, an output primitive may take the form of three domain vertices, where a domain vertex may comprise only a UV coordinate or may comprise a UV coordinate plus other parameters (e.g. a displacement factor and optionally, parent UV coordinates).

The tiling unit 210 generates per-tile display lists and outputs these, for example to the parameter memory 205. Each per-tile display list identifies, for a particular tile, those primitives which are at least partially located within that tile. These display lists may be generated by the tiling unit 210 using a tiling algorithm. Subsequent elements within the GPU pipeline 200, such as the rasterization phase 204, can then read the data from parameter memory 205.

The rasterization phase 204 rasterises some or all of the primitives generated by the geometry processing phase 202. The rasterization phase 204 comprises line rasterization hardware 211 and may also comprise conservative rasterization hardware 212 and/or other elements not shown in FIG. 2.

The line rasterization hardware 211 implements the diamond exit rule and in particular implements the method of rasterising aliased lines as described below. Where provided, the conservative rasterization hardware 212 in the rasterization phase 204 determines, for each pixel and for each of a plurality of primitives (e.g. each primitive on a per-tile display list), whether the pixel (i.e. the square pixel area, rather than a single sample position within the pixel) is partially or fully overlapped by the primitive. This is referred to as outer and inner coverage respectively. As described below, whilst the line rasterization hardware 211 and conservative rasterization hardware 212 are shown as separate blocks in FIG. 2, in various examples some of the hardware logic may be shared between the blocks and/or the two blocks may be merged because of the re-use of hardware for both conservative rasterization and line rasterization (in particular using the diamond exit rule).

Figure 3:
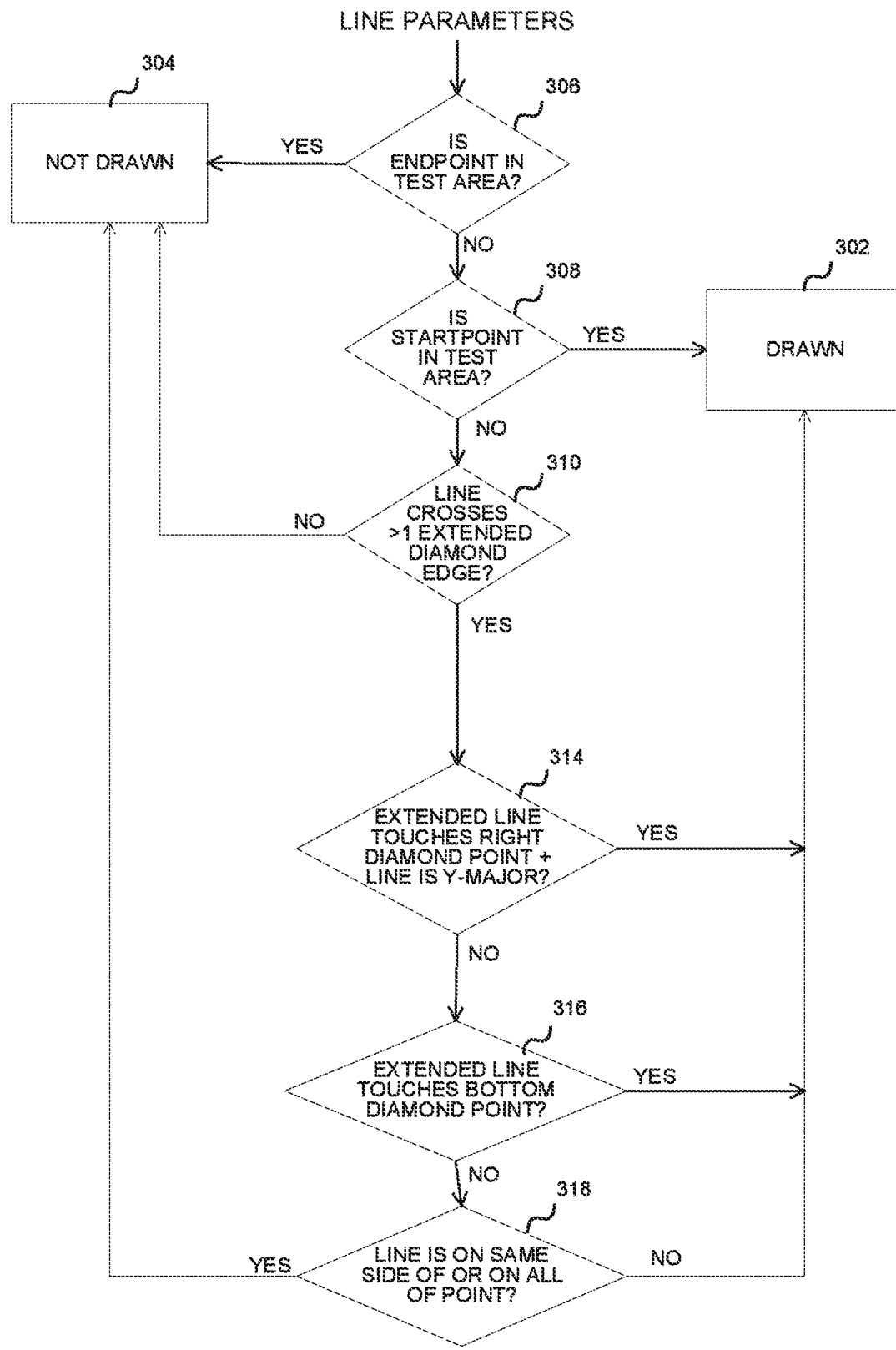
FIG. 3 is a flow diagram of a method of line rasterization which may be implemented by the line rasterization hardware shown in FIG. 2.

FIG. 3 is a flow diagram of a method of line rasterization which may be implemented by the line rasterization hardware 211 in FIG. 2. As shown in FIG. 3, the method involves a hierarchy of tests which are applied to a plurality of pixels for each line which is to be rendered (or for each line segment of a line strip) and the order in which the tests are performed results in an efficient implementation (e.g. as it allows the test preconditions to be calculated at substantially the same time). Whilst a separate final determination is made for each pixel that is considered and for each line, computations that are involved in one of the tests may be reused for other tests for the same pixel and/or the same or different tests for different pixels and various examples of this will be described below.

The line rasterization method of FIG. 3 takes as inputs the parameters for the line to be rasterized. In various examples the method may be implemented for groups of pixels substantially in parallel.

The output of the line rasterization method of FIG. 3 is, for each pixel, a determination as to whether the pixel is drawn as part of the aliased line (block 302) or not drawn as part of the aliased line (block 304). Instead of the terms 'drawn' and 'not drawn', the terms 'visible' and 'not visible' may alternatively be used, with a pixel that is considered visible corresponding to a pixel which forms part of the rendered line and is therefore drawn and a pixel that is considered not visible corresponding to a pixel that does not form part of the rendered line and is therefore not drawn.

The line parameters which are input to the method of FIG. 3 may comprise the start and end points of the line and coefficients A, B and C from the equation of a line that passes through the start and end points of the line, which may be a vector of the form:

$$Ax+By+C$$

Figure 5:
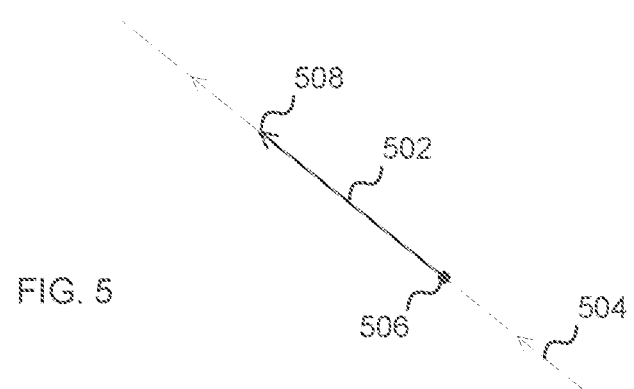
FIG. 5 is a schematic diagram showing the relationship between a line and the corresponding extended line.

The coefficients A, B and C are constants. This vector may be referred to as the 'extended line' because the vector does not specify either the start or end point but extends beyond both. FIG. 5 is a schematic diagram showing the relationship between a line 502 and the corresponding extended line 504. The line 502 starts at the start point 506 (indicated by the small circle) and ends at the end point 508 (indicated by the arrow head) whilst the extended line passes through the start point 506 and then the end point 508 in a direction that is defined by the coefficients A and B. Alternatively, instead of inputting the coefficients A, B and C, the line parameters input to the method of FIG. 3 may only comprise the start and end points and the method of line rasterization may include an additional block (not shown in FIG. 3) in which the vector of the extended line is calculated and hence the values of the coefficients A, B and C are determined.

As shown in FIG. 3, the first two tests within the hierarchy comprise first testing whether the end point is in the diamond test area (block 306) and then testing whether the start point is in the diamond test area (block 308). If the end point is in the diamond test area ('Yes' in block 306), then the pixel is not drawn as part of the aliased line (block 304). If the end point is not in the diamond test area ('No' in block 306) and the start point is in the diamond test area ('Yes' in block 308) then the pixel is drawn as part of the aliased line (block 302).

Figure 6:
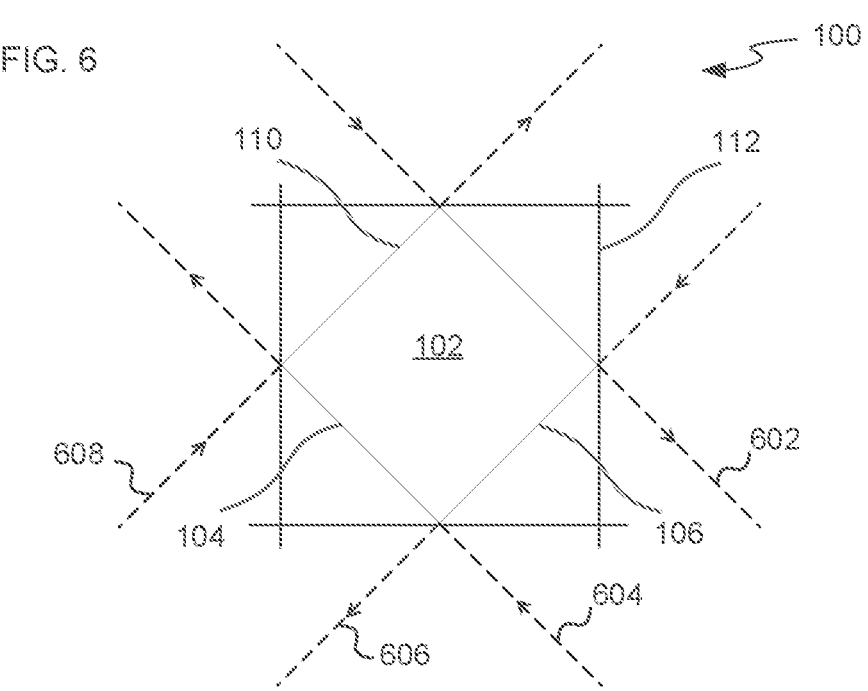
FIG. 6 is a schematic diagram showing the four extended diamond edges of a pixel.

If, however, the end point is not in the diamond test area ('No' in block 306) and the start point is not the diamond test area ('No' in block 308) then the method progresses to the third test (block 310). In this test, a determination is made as to whether the line crosses more than one extended diamond edge or not. The four extended diamond edges 602-608 of a pixel 100 are shown in FIG. 6. Like the extended line shown in FIG. 5 and described above, an extended diamond edge passes through the two corners at the ends of the diamond edge and extends beyond both those corners. In defining the vectors of the extended diamond edges, which may have the form ax+by+c, a convention may be used to determine whether the constant coefficients a and b are positive or negative and in the example shown in FIG. 6, the extended diamond edges are defined as follows:

| Diamond edge | a coefficient | b coefficient |
| --- | --- | --- |
| Lower-left edge 104 | positive | negative |
| Lower-right edge 106 | negative | negative |
| Upper-right edge 112 | negative | positive |
| Upper-left edge 110 | positive | positive |

The actual values of the coefficients for a pixel may be obtained from a look-up table (LUT) or otherwise calculated, and various examples are described below. Unlike the coefficients of the extended line (which are different for each line that is rasterized), the coefficients of the extended diamond edges are fixed.

If the line does not cross more than one extended diamond edge ('No' in block 310, where this may be determined as described below), then the pixel is not drawn as part of the aliased line (block 304), but if the line does cross more than one extended diamond edge ('Yes' in block 310), then the method progresses to the fourth and fifth tests (blocks 314, 316) which may be performed in any order. If the extended line touches the right diamond point 118 and is y-major ('Yes' in block 314), then the pixel is drawn as part of the aliased line (block 302). If the extended line touches the bottom diamond point 108 ('Yes' in block 316), then the pixel is drawn as part of the aliased line (block 302). If the extended line does not satisfy either of these tests ('No' in both of blocks 314, 316), then the method progresses to the sixth test. In the sixth test (block 318), it is determined whether the line is on the same side of, or on, all four of the diamond points 108, 114, 116, 118. If the line is on the same side of, or on, all four diamond points ('Yes' in block 318), then the pixel is not drawn as part of the aliased line (block 304), but if the line is not on the same side of, or on, all four of the diamond points 108, 114, 116, 118 ('No' in block 318), then the pixel is drawn as part of the aliased line (block 302).

Figure 4:
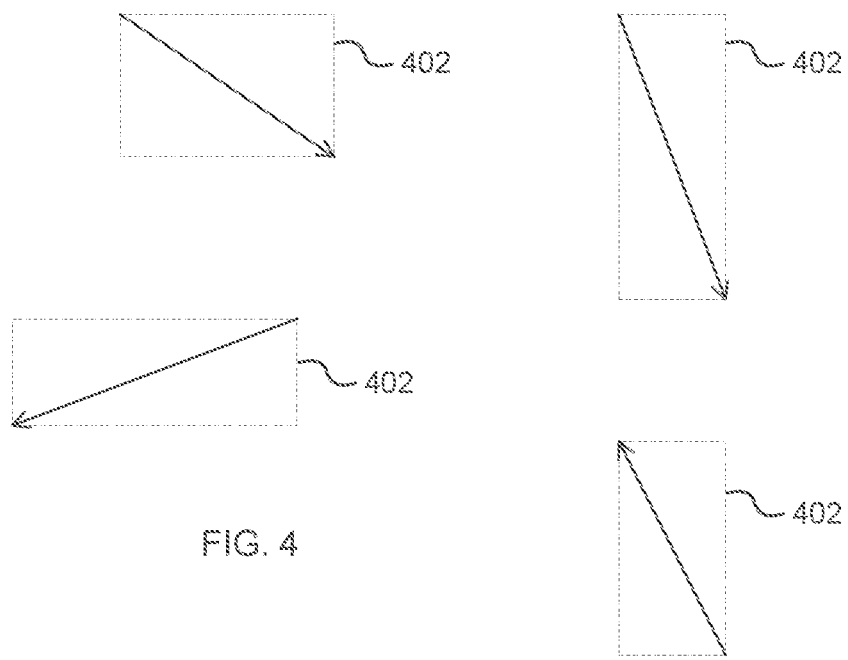
FIG. 4 is a schematic diagram showing example bounding boxes.

After the method of FIG. 3, a bounding box test may be applied to those pixels which are marked as drawn (in block 302). This test filters out any pixels that are marked as drawn but which fall outside the bounding box of the line being rasterized. The bounding box of the line being rasterized is a rectangle drawn around the line, with the start and end points of the line as two diagonally opposite corners of the rectangle and the sides of the rectangle running parallel to the edges of the pixels (e.g. vertically and horizontally) and various example bounding boxes 402 are shown in FIG. 4.

An example implementation of the method of FIG. 3 can be written as:
  end_edge_inside—this is 4 bits, one for each diamond edge, each bit indicating whether or not the end point is considered to be on the 'inside' (i.e. on a bottom edge would be included)—this is the first test (block 306)
  start_edge_inside—this is 4 bits, one for each diamond edge, each bit indicating whether or not the start point is considered to be on the 'inside' (i.e. on a bottom edge would be included)—this is the second test (block 308)
  quad_cross—this is 1 when bit count(end_edge_inside xor start_edge_inside)>1 else 0—this is third test (block 310)

edge_on—this is an indication as follows, using the test results of the line edge vs. diamond points:
=1 if the line touches the right diamond point and is y-major—this is the fourth test (block 314)
=1 if the line touches the bottom diamond point—this is the fifth test (block 316)
=0 otherwise
left_count—this is the number of diamond points that are on or to the left of the extended line
right_count—this is the number of diamond points that are on or to the right of the extended line
if edge_on=0 and (right_count=4 or left_count=4) then crosses=0—this is the sixth test (block 318)

Like FIG. 3, this example does not include any bounding box test and this may, for example, be implemented as a mask at the end of the method on those pixels indicated as drawn (i.e. to remove from the set of pixels to be drawn any pixels that are considered drawn but which fall outside the bounding box).

It will be appreciated that the order of tests shown in FIG. 3 and in the example implementation above, may be varied without changing the overall result (i.e. as to whether a pixel is drawn or not drawn). For example, the check of whether a line crosses more than one extended diamond edge (in block 310) may alternatively be positioned after the 'No' in the sixth test (block 318).

In various examples, the method of FIG. 3 may be implemented substantially in parallel for a group of pixels, e.g. for all the pixels in a microtile.

Many of the tests in the method of FIG. 3 involve performing an edge test, i.e. testing whether a sample position (which may be the start or end point of the line or a corner of the diamond test area) is to the left or the right or on a particular edge (which may be the extended line or an extended diamond edge). Given an edge defined by a vector of the form:

$$f(x,y) = \alpha x + \beta y + \gamma$$

where $\alpha$, $\beta$ and $\gamma$ are constant coefficients specific to the particular edge (e.g. $\alpha=A$, $\beta=B$ and $\gamma=C$ for the extended line and $\alpha=a$, $\beta=b$ and $\gamma=c$ for an extended diamond edge) then the edge test may be performed by calculating the value, or the sign of $f(x,y)$ for the edge (block 402). This is because:

If $f(x,y)$ is calculated to be positive (i.e. greater than zero), then the sample position is to the right of the edge
If $f(x,y)$ is calculated to be negative (i.e. less than zero), then the sample position is to the left of the edge
If $f(x,y)$ is calculated to be exactly zero, then the sample position is precisely on the edge In particular, the first test (block 306) comprises setting the sample position to be the end point (i.e. setting the values of x and y to be the coordinates of the end point) and performing edge tests for each of the extended diamond edges (i.e. using values of $\alpha$, $\beta$ and $\gamma$ for each of the extended diamond edges). Four edge test results are therefore calculated for the end point. Using the convention for the extended diamond edges shown in FIG. 6 and described above, the end point of the line is considered to be in the diamond test area ('Yes' in block 306) if the value of each of the edge test results for the end point (e.g. each calculated value of $f(x,y)$ with x,y values corresponding to the end point) for each of the extended diamond edges meets the following criteria:

| Extended diamond edge | Criteria to be considered in the test area |
|---|---|
| Lower-left edge 104 | f(x, y) is positive or zero |
| Lower-right edge 106 | f(x, y) is positive or zero |
| Upper-right edge 112 | If the fractional part of the x-coordinate of the end point is zero and the line is not x-major: f(x, y) is positive or zero Else: f(x, y) is positive |
| Upper-left edge 110 | f(x, y) is positive |

Similarly, the second test (block 308), comprises setting the sample position to be the start point (i.e. setting the values of x and y to be the coordinates of the start point) and performing edge tests for each of the extended diamond edges (i.e. using values of $\alpha$, $\beta$ and $\gamma$ for each of the extended diamond edges, which are the same as in the first test). Four edge test results are therefore calculated for the start point. Using the convention for the extended diamond edges shown in FIG. 6 and described above, the start point of the line is considered to be in the diamond test area ('Yes' in block 308) if the value of each of the edge test results for the start point (e.g. each calculated value of $f(x,y)$ with x,y values corresponding to the start point) for each of the extended diamond edges meets the criteria set out in the table above.

In the table of criteria given above (and used in the first and second tests), the condition relating to the upper-right edge (i.e. the determination of whether the fractional part of the x-coordinate of the end point is zero and the line is not x-major) checks whether the start/end point is exactly on the right diamond point. In practice, any test that is looking to see if the value of $f(x,y)$ is positive or zero can be implemented by modifying the test by adding or subtracting one LSB in the final sum/comparison and then still testing to see if the result is positive, which requires a smaller area of hardware than testing to see if the result is exactly zero. In particular, instead of evaluating:

$$\alpha x + \beta y + \gamma > 0$$

the evaluation is:

$$\alpha x + \beta y + \gamma + (\text{one LSB}) > 0$$

This means that if $\alpha x+\beta y+\gamma \geq 0$, the test will return a positive value, whereas it otherwise would not. By adding only a single LSB, only the sign of the exact equivalent case (where $\alpha x+\beta y+\gamma=0$) is changed.

The addition of a single LSB also works when evaluating:

$$\alpha x + \beta y + \gamma + (\text{one LSB}) < 0$$

In this evaluation, the addition of a single LSB turns a result that would be false, because $\alpha x+\beta y+\gamma=0$ (i.e. a sample point exactly on an edge) into a 'true' result. This can be used to redefine whether or not a sample point that lies exactly on an edge is on the inside or outside of the test area.

The third test (block 310) reuses the edge test results (i.e. the signs or values of $f(x,y)$) from the first and second tests (blocks 306-308). This is because a line crosses an extended diamond edge if the start and end points have edge test results (e.g. values of $f(x,y)$) which are of opposite sign, i.e. the line crosses an extended diamond edge if the start point is to the left of the extended diamond edge (edge test is negative) and the end point is to the right of the extended diamond edge (edge test is positive), or if the start point is to the right of the extended diamond edge (edge test is positive) and the end point is to the left of the extended diamond edge (edge test is negative).

The fourth test (block 314) does not reuse edge test results from the first or second tests, but instead comprises setting the sample position to be the right diamond point 118 (i.e. setting the values of x and y to be the coordinates of the right diamond point 118) and performing an edge test for the extended line (i.e. using values of $\alpha$, $\beta$ and $\gamma$ for the extended line). The extended line touches the right diamond point 118 if the edge test result is exactly zero and the extended line is y-major.

The fifth test (block 316) comprises setting the sample position to be the bottom diamond point 108 (i.e. setting the values of x and y to be the coordinates of the bottom diamond point 108) and performing an edge test for the extended line (i.e. using values of $\alpha$, $\beta$ and $\gamma$ for the extended line). The extended line touches the bottom diamond point 108 if the edge test result is exactly zero.

The sixth test (block 318) reuses the edge test results from the fourth and fifth tests, in order to provide the edge test for the extended line in relation to the right diamond point and the bottom diamond point. In addition, the sixth test comprises two further edge test calculations in relation to the extended line (i.e. using values of $\alpha$, $\beta$ and $\gamma$ for the extended line) with the sample positions (i.e. the x and y values) in these being set to the two remaining diamond points, i.e. the left diamond point 116 and the top diamond point 114. Once the four edge test results are obtained, the sixth test determines whether the extended line is on the same side of or on all the diamond points, i.e. the signs of each of the edge test results are the same.

Figure 7:
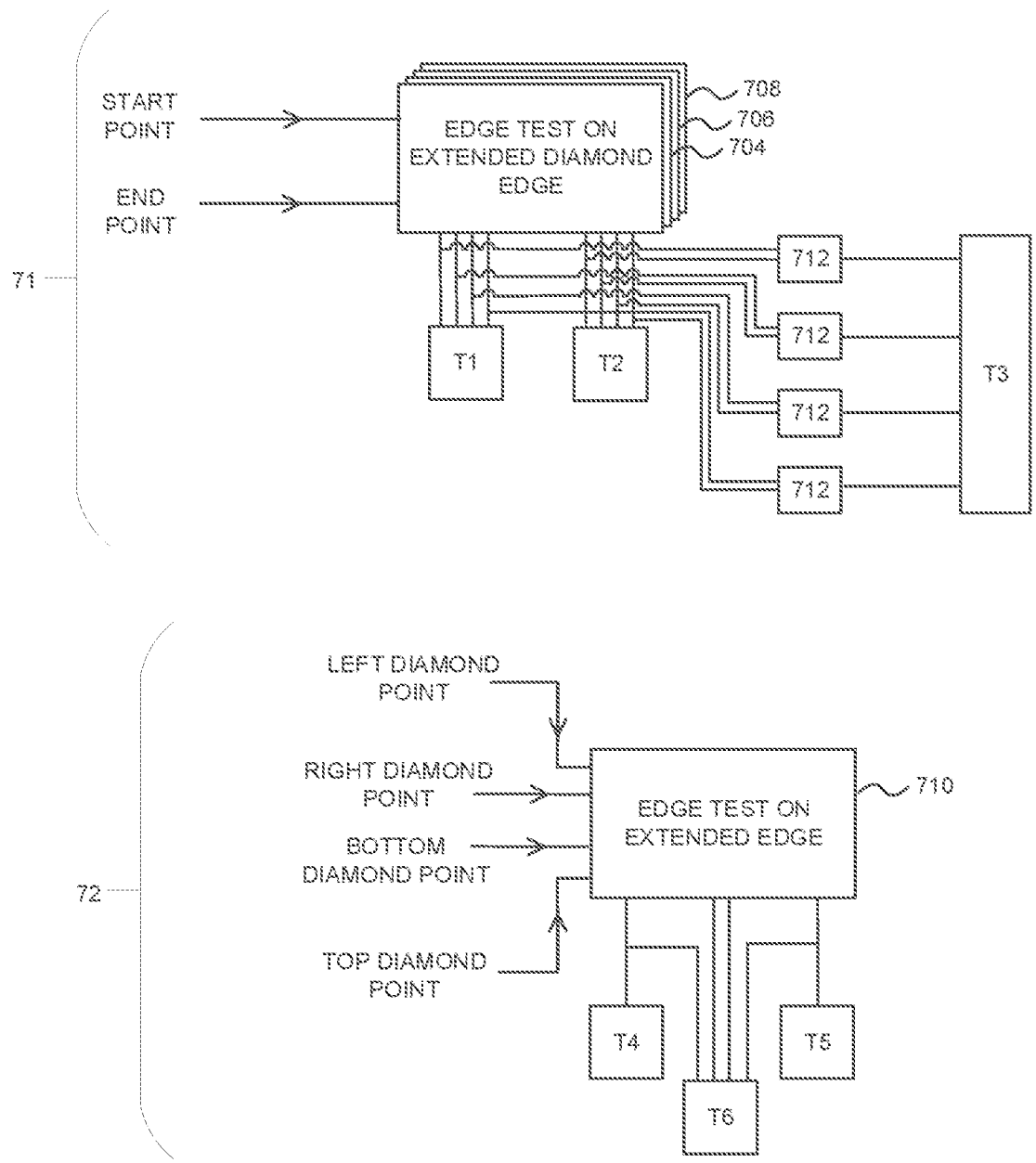
FIG. 7 is a schematic diagram of example line rasterization hardware that implements the method of FIG. 3 for a single pixel.

FIG. 7 is a schematic diagram of example line rasterization hardware that implements the method of FIG. 3 for a single pixel and shows the reuse of results between tests. In the example of FIG. 7, there are five edge test hardware logic blocks 702-710 that perform edge test calculations for each of the extended diamond edges of a diamond test area within a pixel and for the extended line i.e. which calculates f(x,y). The start and end points of the line are input as sample positions to each of the four edge test hardware logic blocks corresponding to the extended diamond edges 702-708 along with the coefficients a, b and c for the extended diamond edges, resulting in four edge test results for each sample position. The four edge test results for the end point are used in the first test (logic block T1) and the four edge test results for the start point are used in the second test (logic block T2). The logic blocks that implement the first and second tests (logic blocks T1, T2) may, for example, comprise logic that implements an AND logic function because only if all four inputs (one corresponding to each extended diamond edge) are positive (e.g. logic one) is the test satisfied.

Pairs of the edge test results that relate to the same extended diamond edge are combined and used in the third test (logic block T3). As shown in FIG. 7, pairs of edge results (with each pair comprising an edge result for each of the start and end points for the same extended diamond edge) may be combined using logic 712 that implements an XOR logic function to determine if the two results have opposite signs (with the 'inside' test being modified as set out in the criteria in the table above). The logic block that implements the third test (logic block T3), then determines whether more than one of the pairs comprises results with opposite signs by combining the outputs from the XOR logic 712 and determining if two or more are logic ones.

The coordinates of each of the diamond points are input as sample positions to the edge test hardware logic block corresponding to the extended line 710, resulting in four edge test results per pixel, one for each sample position (i.e. one for each diamond point). Two of the edge test results are used in one of the fourth and fifth tests (logic blocks T4 and T5) and all four edge test results are used in the sixth test (logic block T6).

Whilst the arrangement shown in FIG. 7 comprises five separate edge test hardware logic blocks, each corresponding to a different edge, it will be appreciated that in other examples, edge test hardware logic may be used for more than one edge and the edge coefficients (e.g. the values of $\alpha$, $\beta$ and $\gamma$) may be input to the edge test hardware logic along with the coordinates (e.g. the x, y values) of the sample positions that are being compared to the edge by the edge test hardware logic. Similarly, in various examples, the edge test hardware logic blocks may be duplicated where they are used to compute edge values for multiple sample points, so that multiple edge test results (for different sample positions) can be calculated in parallel.

Furthermore, although there are four extended diamond edges for a pixel (e.g. as shown in FIG. 6), as the edges comprises two pairs of parallel edges, it is not necessary to separately perform edge tests for all four extended diamond edges. Instead, by inverting the edge test result for one of a pair of parallel edges (e.g. the edge test result for the lower-right extended diamond edge 106) and adding a constant, the edge test result for the other of the pair of parallel edges (e.g. the edge test result for the upper-left extended diamond edge 110) can be obtained. This therefore halves the number of edge tests that need to be performed in relation to the extended diamond edges (e.g. in the first, second and third tests in FIG. 3, blocks 306-310) for a single pixel. The result is inverted because the extended diamond edges are vectors in opposite directions (as shown in FIG. 6 and by the signs of the coefficients in the table above) and the constant that is added shifts the result across from one side of the diamond test area to the other. In various examples, where the size of a pixel is 1×1, the values of a and b may be set to ±0.5, the constant that is added may be set to +0.5 to move from the lower-right diamond edge 106 to the upper-left diamond edge 110, or set to −0.5 to move from the upper-right diamond edge 112 to the lower-left diamond edge 104. Alternatively, the values of a, b and c may all be scaled without changing the pixel size. Consequently, the hardware arrangement for a single pixel as shown in FIG. 7 may be modified such that there are only two hardware logic units that perform edge tests on extended diamond edges and the hardware logic that performs the first, second and third tests (T1-T3) may include hardware logic to generate the results for the other two extended diamond edges by modifying the result of the sum of products (SOP), f(x,y) before taking the sign (e.g. by inverting results and adding the appropriate constant, i.e. +0.5 or −0.5).

Figure 8:
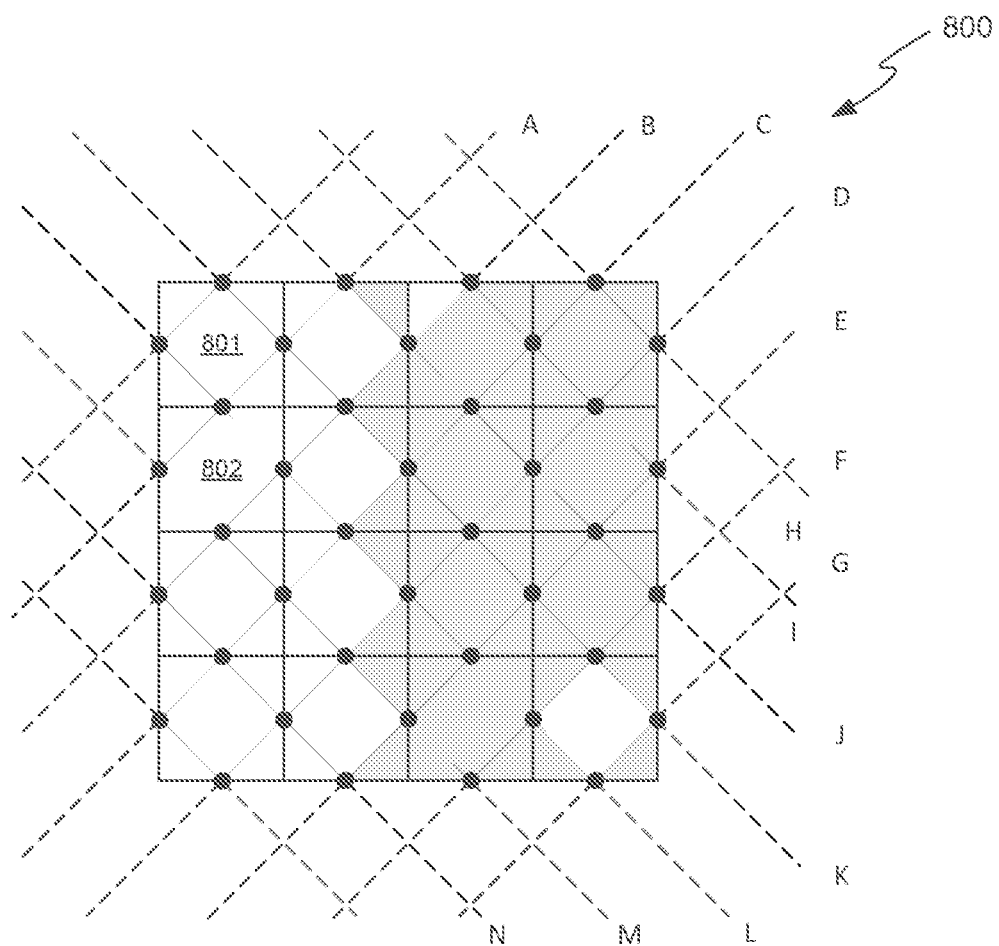
FIG. 8 is a schematic diagram showing the extended diamond edges of a group of 16 pixels.

As well as reusing results for different tests for the same pixel, as described above, where the method of FIG. 3 is implemented substantially in parallel for a group of pixels, e.g. for all the pixels in a microtile, there may be reuse of results between pixels within the group. FIG. 8 is a schematic diagram showing a group of 4×4 pixels, which may in various examples comprise a microtile, and the diamond test areas for each of the 16 pixels. Whilst each diamond test area has four corners, for the 4×4 grid of pixels there are only 40 different corner positions (rather than 16×4=64). These 40 different corner positions may be considered to be two samples per pixel, e.g. the top diamond point 114 and the left diamond point 116 of each of the 16 pixels in the 4×4 grid, plus 8 extra pixels: the bottom diamond point 108 of the bottom four pixels in the grid and the right diamond point 118 of the right-most four pixels in the grid. This reuse of results therefore reduces the number of computations that need to be performed (e.g. in hardware logic) in order to implement the fourth, fifth and sixth tests of the method shown in FIG. 3 (blocks 314-318), i.e. the reuse of results reduces the number of edge tests that need to be performed to compare the diamond points of each pixel to the extended line.

FIG. 8 also shows the extended diamond edges, a subset of which have been labelled A-N. It can be seen from FIG. 8 that whilst each diamond test area has four extended edges, adjacent pixels share extended edges, although in order to maintain the direction convention shown in FIG. 6 and described above, it is necessary to invert and adjust the result of the SOP, f(x,y), before taking the sign. So, in addition to only calculating two edge test results for extended diamond edges for a single pixel, when considering a group of pixels, the results can be further reused by performing the relevant inversions and adding a multiple of ±0.5 to shift the edge across the grid of pixels. This means that it is not necessary to perform 64 independent edge tests, as would otherwise be needed (i.e. 2 edge tests per pixel for each of the start and end points, 2×16×2=64). Instead, a plurality of adders may be provided to evaluate the 2×14×2 edges (2 sample positions—the start and the end points, 14 edges A-N, 2 directions) substantially in parallel by reusing results between edges.

In various examples, only four independent edge tests may be performed in relation to the extended diamond edges, with these four tests corresponding to tests for each of two edges for the start point and the end point of the line and then one or more look-up tables (LUTs) may be used to determine, for any extended diamond edge for any of the pixels in the group being considered (e.g. in a 4×4 pixel microtile) which edge test result (of the two for the particular sample position) to select, whether to invert the result of that selected edge test and the value of the constant to add (where this constant may be zero in some cases). In other examples, instead of using LUTs to determine whether to invert the result and/or identify the value of the constant, this may be calculated in hardware logic.

Figure 9:
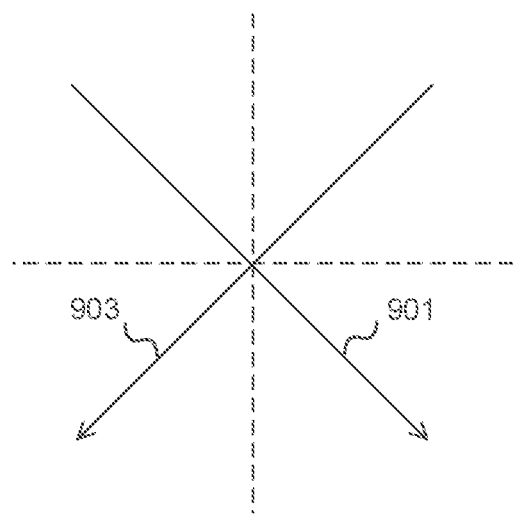
FIG. 9 is a schematic diagram showing two extended edges which may be used to calculate results for all the extended diamond edges shown in FIG. 8.

In various examples, two edge test hardware logic blocks may be used to calculate edge test results for two perpendicular extended edges 901, 903 passing through the origin, as shown in FIG. 9, and x,y values corresponding to the start point and end point ($x_{start}, y_{start}$ and $x_{end}, y_{end}$) of the line that is being rasterized. In such examples, the two vectors have the form:

$$f_{901}(x,y) = -0.5x + 0.5y$$

$$f_{903}(x,y) = -0.5x - 0.5y$$

And this generates four results: $f_{901}(x_{start}, y_{start})$, $f_{903}(x_{start}, y_{start})$, $f_{901}(x_{end}, y_{end})$, $f_{903}(x_{end}, y_{end})$. The edge test results for the extended diamond edges in a pixel are then given by:

$$f(x,y) = i(F+g+h) = iF + ig + ih$$

Where F is one of the four calculated edge test results (i.e. one of $f_{901}(x_{start}, y_{start})$, $f_{903}(x_{start}, y_{start})$, $f_{901}(x_{end}, y_{end})$ and $f_{903}(x_{end}, y_{end})$ from above) and the coefficient i, where i=±1, determines whether the edge test result is inverted or not. The g coefficient shifts the result by a quarter of a pixel, g=±0.25, to move the edge away from the origin so that it passes through a diamond point and the h coefficient is a multiple of 0.5 and steps the edge across the grid of pixels. The values of i, F, g and h are fixed per specific diamond edge and may, for example, be determined from one or more LUTs and examples are provided below.

The LUT below may be used to determine the value of i for each diamond edge of each pixel in the 4×4 grid of pixels 800 in FIG. 8 and provides an index (e.g. in terms of the letter of the edge, in the example shown, using the labelling scheme shown in FIG. 8) to the second LUT that provides the values of g and h and also identifies which of the four calculated edge test results are used, i.e. identifies the value of F. Each cell in the LUT below contains four values, arranged as follows:

| Upper-left edge | | Upper-right edge | |
| Lower-left edge | | Lower-right edge | |
|---|---|---|---|
| −A +K | −B +J | −C +I | −D +H |
| −K +A | +J +B | −I +C | −H +D |
| −B +L | −C +K | −D +J | −E +I |
| −L +B | −K +C | −J +D | −I +E |
| −C +M | −D +L | −E +K | −F +J |
| −M +C | −L +D | −K +E | −J +F |
| −D +N | −E +N | −F +L | −G +K |
| −N +D | −N +E | −L +F | −K +G |

Where a value −X corresponds to 1=−1 and an index of X and a value of +X corresponds to i=+1 and an index of X, e.g. the value −A identifies that 1=−1 and the index is A.

As shown in the LUT above, the value of i is always −1 for the upper-left and lower-left diamond edges and +1 for the upper-right and lower-right diamond edges in examples where the two edge tests that are calculated are the two downwards edges 901, 903, as shown in FIG. 9. The values of i will be different if two different edges are calculated. For edges with the label A-G (i.e. all upper-left and lower-right edges), the value of F is $f_{903}(x,y)$ and for edges with the label H-N (i.e. all upper-right and lower left edges) the value of F is $f_{901}(x,y)$. In various examples, a single bit may be stored in the LUT above for each edge A-N (in addition to the index) that indicates the direction of the edge (i.e. parallel to edge 901 or edge 903 in FIG. 9), with a one indicating one direction (e.g. such that the line is parallel to edge 901 and F=$f_{901}(x,y)$) and a zero indicating the other direction (e.g. such that the line is parallel to edge 903 and F=$f_{903}(x,y)$). For example:

| −A,0 +K,1 | −B,0 +J,1 | −C,0 +I,1 | −D,0 +H,1 |
|---|---|---|---|
| −K,1 +A,0 | +J,1 +B,0 | −I,1 +C,0 | −H,1 +D,0 |
| −B,0 +L,1 | −C,0 +K,1 | −D,0 +J,1 | −E,0 +I,1 |
| −L,1 +B,0 | −K,1 +C,0 | −J,1 +D,0 | −I,1 +E,0 |
| −C,0 +M,1 | −D,0 +L,1 | −E,0 +K,1 | −F,0 +J,1 |
| −M,1 +C,0 | −L,1 +D,0 | −K,1 +E,0 | −J,1 +F,0 |
| −D,0 +N,1 | −E,0 +N,1 | −F,0 +L,1 | −G,0 +K,1 |
| −N,1 +D,0 | −N,1 +E,0 | −L,1 +F,0 | −K,1 +G,0 |

The LUT below shows the values of g and h for the edges A-N where i=+1 and the values of −g and −h where 1=−1. This means that the hardware logic that calculates f(x,y) does not need to perform a separate negation operation for these constants as part of the calculation, but negation of the selected value of F is still required where 1=−1. Alternatively, the LUT may store +g and +h values where 1=−1 in the same way as it stores +g and +h values where i=+1.

| Where i = +1 | | | Where i = −1 | | |
|---|---|---|---|---|---|
| Edge direction | g | h | Edge direction | −g | −h |
| A   Down to left  | 0.25 | +0.5 | Up to right | 0.25 | −0.5 |
| B   | 0.25 | +1.0 | | 0.25 | −1.0 |
| C   | 0.25 | +1.5 | | 0.25 | −1.5 |
| D   | 0.25 | +2.0 | | 0.25 | −2.0 |
| E   | 0.25 | +2.5 | | 0.25 | −2.5 |
| F   | 0.25 | +3.0 | | 0.25 | −3.0 |
| G   | 0.25 | +3.5 | | 0.25 | −3.5 |
| H   Down to right | 0.25 | +1.5 | Up to left  | 0.25 | −1.5 |
| I   | 0.25 | +1.0 | | 0.25 | −1.0 |
| J   | 0.25 | +0.5 | | 0.25 | −0.5 |
| K   | 0.25 |  0.0 | | 0.25 |  0.0 |
| L   | 0.25 | −0.5 | | 0.25 | +0.5 |
| M   | 0.25 | −1.0 | | 0.25 | +1.0 |
| N   | 0.25 | −1.5 | | 0.25 | +1.5 |

In the example LUT above, the values of g and h are specified separately; however, in various examples, there may instead be a single parameter which is g+h (or −g−h where 1=−1). In other examples, the value of g (and −g) may not be stored in a LUT but instead a constant offset (of 0.25) may be applied to all edge test results irrespective of the value of i.

It will be appreciated that the example LUTs provided above may be used where the two edge tests that are calculated are the two downwards edges 901, 903, as shown in FIG. 9. The values of g and h will be different if two different edges are calculated.

Figure 10:
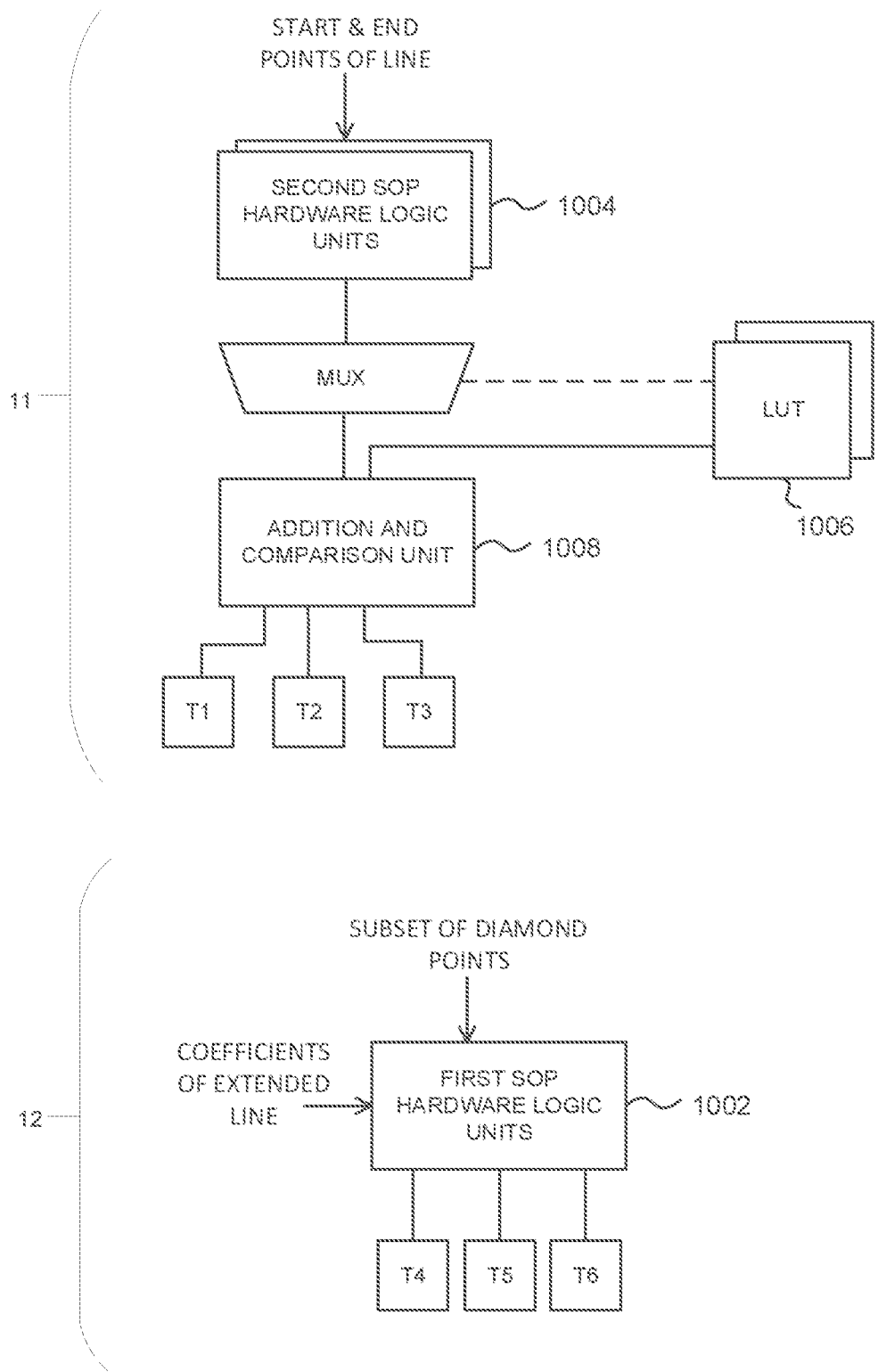
FIG. 10 is a schematic diagram of example line rasterization hardware that implements the method of FIG. 3 for a group of pixels.

FIG. 10 is a schematic diagram of example line rasterization hardware that implements the method of FIG. 3 for a group of pixels and shows the reuse of results between tests. In the example of FIG. 10, the rasterization hardware comprises the test hardware logic units T1-T6 (as described above with reference to FIG. 7) and a first sum of products (SOPs) hardware logic unit 1002 that performs the edge test for the extended line for a subset of all the diamond points of the group of pixels (as described above). This first SOP hardware logic unit 1002 therefore calculates f(x,y)=αx+βy+γ using the coefficients (i.e. values of α, β and γ) for the extended line (e.g. A, B and C) which may be received as inputs by the first SOP hardware logic unit 1002. Coordinates of the diamond points (e.g. two points per pixel plus the additional points, as detailed above) may also be input or may be obtained from a LUT as these are fixed points. The results from the first SOP hardware logic unit 1002 are input to the test hardware logic units T4-T6 that perform the fourth, fifth and sixth tests of the method of FIG. 3 (blocks 314-318) as described above.

The rasterization hardware further comprises two second sum of products (SOPs) hardware logic units 1004. One of these units 1004 calculates $f_{901}(x_{start},y_{start})$ and $f_{901}(x_{end},y_{end})$ and the other calculates $f_{903}(x_{start},y_{start})$ and $f_{903}(x_{end},y_{end})$ using the coordinates of the start and end points of the line that is being rasterized and which are received as inputs by the second SOP hardware logic units 1004. The coefficients in the SOP (e.g. ±0.5) are fixed as detailed above. The rasterization hardware further comprises memory storing one or more LUTs 1006 (as detailed above) that store the different constants for the different extended diamond edges for the group of pixels (e.g. values of i, g and h) and an addition and comparison hardware logic unit 1008 that sums an output from a second SOP hardware logic unit 104 and one or more constants from the LUTs 1006, including performing any necessary negation, to generate the edge test results, f(x,y), for each extended diamond edge of each pixel. The results from the addition and comparison hardware logic unit 1008 are input to the test hardware logic units T1-T3 that perform the first, second and third tests of the method of FIG. 3 (blocks 306-310).

As noted above, instead of using LUTs to determine the values of one or more of i, g and h, these may be calculated in hardware logic or otherwise determined (e.g. the value of i may be implicit in that it is a consequence of the way the inputs, h or ih, are fed into the additional and comparison unit 1008 and hence is essentially set, and fixed, within the hardware). In such examples, one or more of the LUTs 1006 in FIG. 10 may be replaced by one or more coefficient calculation hardware units. In an example, instead of an LUT that provides the values of h and −h, a third SOP hardware logic unit may be provided that calculates Ax+By and receives as inputs A=2, 8=−0.5, a set of values of x which is {0, 1, 2} (which may also be written as [0,2]) and a set values of y which is also {0, 1, 2, 3}. This enables the third SOP hardware logic unit to calculate all the necessary values of ih as shown below:

| | x | y | ih |
|---|---|---|---|
| A | 1 | 3 | 0.5 |
| B | 1 | 2 | 1 |
| C | 1 | 1 | 1.5 |
| D | 1 | 0 | 2 |
| E | 2 | 3 | 2.5 |
| F | 2 | 2 | 3 |
| G | 2 | 1 | 3.5 |
| H | 1 | 1 | 1.5 |
| I | 1 | 2 | 1 |
| J | 1 | 3 | 0.5 |
| K | 0 | 0 | 0 |
| L | 0 | 1 | −0.5 |
| M | 0 | 2 | −1.0 |
| N | 0 | 3 | +1.5 |

It will be appreciated that other combinations of values of A and B and/or sets of input values x,y may alternatively be used to calculate the values of ih.

The line rasterization hardware shown in FIGS. 7 and 10 above may be implemented in the rasterization phase 204 of FIG. 2 and in particular may correspond to the line rasterization hardware 211 in FIG. 2. Whilst FIG. 2 shows separate line rasterization hardware 211 and conservative rasterization hardware 212, in various examples, the line rasterization method of FIG. 3 may be implemented on the hardware that is also used to perform conservative rasterization or other aspects of rasterization.

Figure 11A:
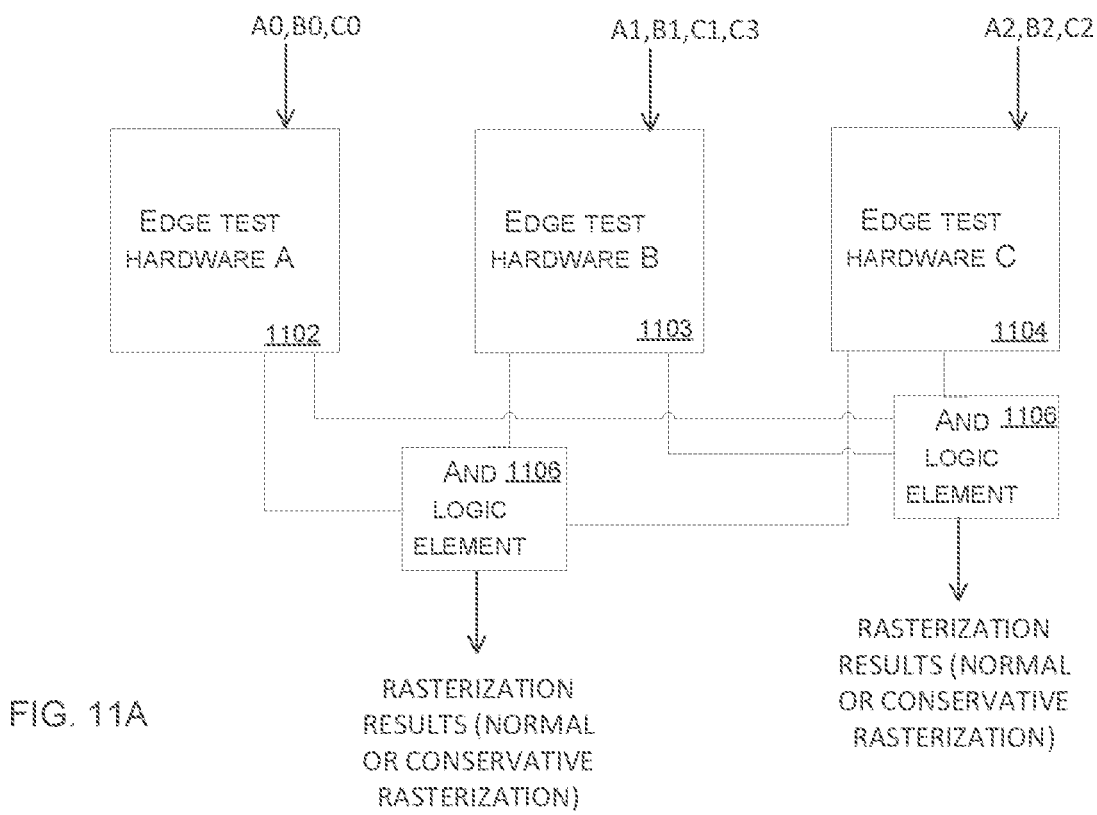
FIG. 11A is a schematic diagram of an example hardware arrangement for performing normal or conservative rasterization.
Figure 11B:
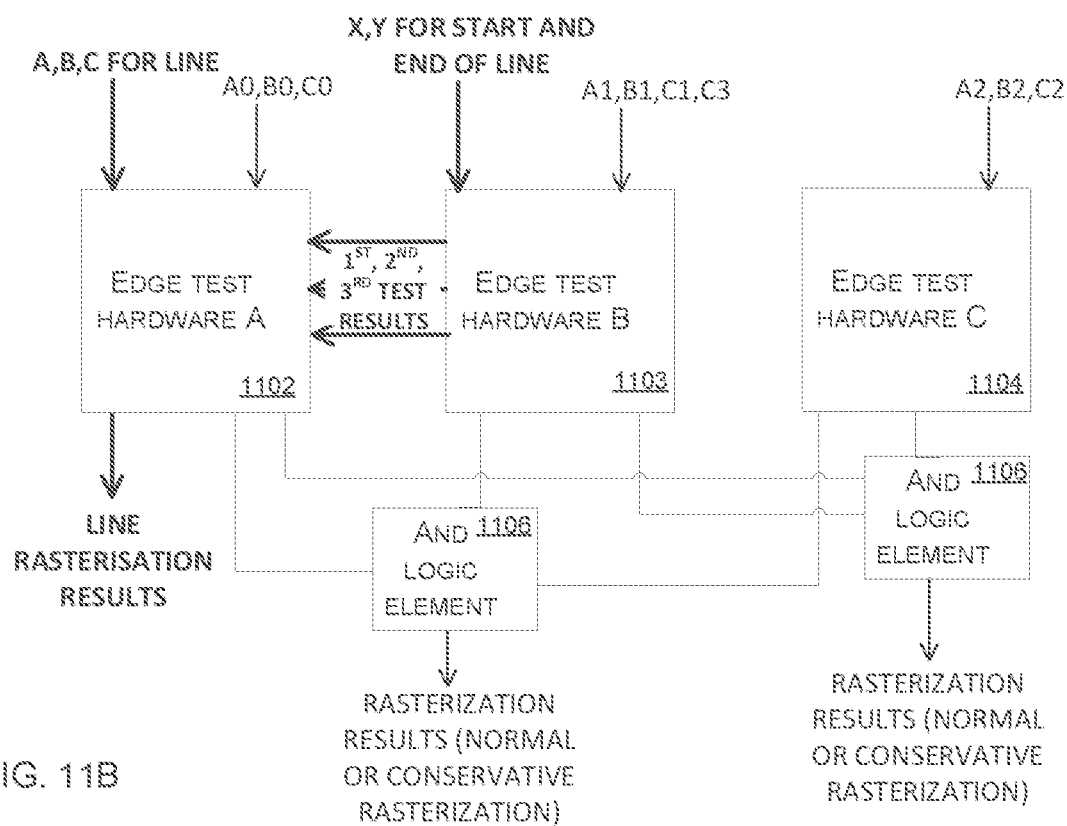
FIG. 11B is a schematic diagram showing how the hardware arrangement of FIG. 11A may additionally be used to perform the line rasterization method of FIG. 3.

FIG. 11A is a schematic diagram of an example hardware arrangement that may be used to perform conservative rasterization or normal rasterization. It comprises three instances of edge test hardware 1102-1104, each of which performs calculations in relation to a different edge of a triangular primitive, or where the primitive is a parallelogram, edge test hardware B, 1103 is configured to perform calculations in relation to two parallel edges of the parallelogram. As shown in FIG. 11A, each instance of edge test hardware 1102-1104 receives as inputs the coefficients of the corresponding primitive edge (A0,B0,C0 for the first edge, A1,B1,C1 for the second edge, A2,B2,C2 for the third edge and for parallelograms, A0,B0,C2 for the third edge and A1,B1,C3 for the fourth edge). As shown in FIG. 11B, this same hardware arrangement may be used to perform conservative rasterization, normal rasterization and the line rasterization method of FIG. 3. Where it is additionally used to perform line rasterization, edge test hardware B 1103 (i.e. the edge test hardware that is arranged to handle two parallel edges for conservative rasterization) is used to perform the first, second and third tests (blocks 306-310) and hence corresponds to the upper portions 71, 11 of the hardware arrangements shown in FIGS. 7 and 10 and described above. Consequently, this instance of the edge test hardware receives as inputs, the x,y coordinates of the start and end of the line that is being rasterized. One of the other instances of edge test hardware, edge test hardware A 1102, is used to perform the fourth, fifth and sixth tests (blocks 314-318) and hence corresponds to the lower portions 72, 12 of the hardware arrangements shown in FIGS. 7 and 10 and described above. The third instance of edge test hardware, edge test hardware C 1104, is not used for line rasterization but is used for conservative or normal rasterization.

Figure 12A:
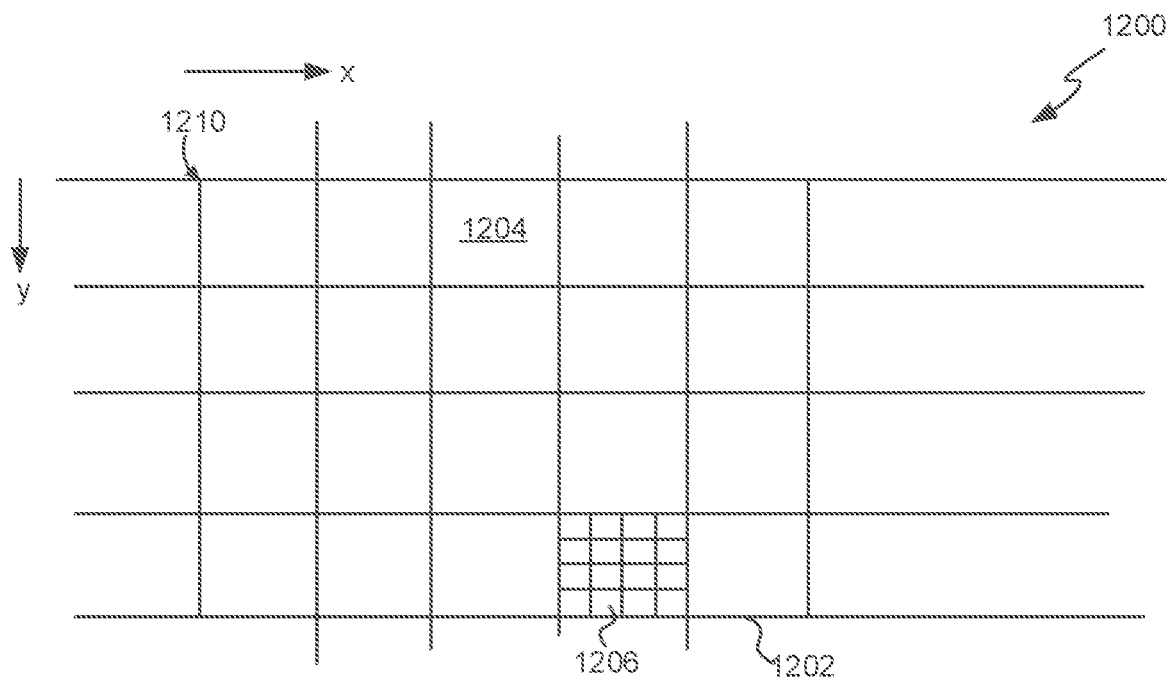
FIG. 12A is a schematic diagram showing subdivision of a rendering space into tiles and microtiles.
Figure 12B:
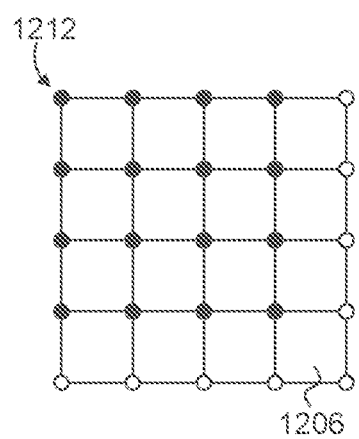
FIG. 12B is a schematic diagram showing a part of FIG. 12A in more detail.

This edge test hardware shown in FIGS. 11A and 11B (as described in co-pending application GB1805608.5, filed 5 Apr. 2018) and its use in conservative rasterization (as described in co-pending application GB1810719.3, filed 29 Jun. 2018), relies on the regular sub-division of the rendering space, as can be described with reference to FIGS. 12A and 12B. The rendering space 1200 is divided into a plurality of tiles 1202 (which may, for example, be square or rectangular) and each tile is further divided into a regular arrangement of smaller areas 1204, referred to as 'microtiles'. Within each tile 1202 there is a pre-defined arrangement of microtiles 1204 and in various examples, all of the microtiles 1204 are the same size. Whilst FIG. 12A shows an arrangement of 5×4 microtiles 1204 within a tile 1202, in other examples there may be a different number of microtiles 1204 in each tile 1202. Each microtile 1204 comprises the same number (and arrangement) of pixels 1206. In the example shown in FIGS. 12A and 12B, each microtile 1204 comprises a 4×4 arrangement of 16 pixels 1206 and a microtile 1204 may, for example, correspond to the group of pixels 800 shown in FIG. 8 and described above.

Given the sub-division of the tile 1202, as described above, the coordinates of sample positions within a pixel 1206 (e.g. the coordinates of pixel corners or diamond points, as defined with reference to the tile origin 1210) can be broken down into three components: x and y offsets of the microtile 1204 relative to the tile 1202, $X_{UT}$, $Y_{UT}$, x and y pixel positions within the microtile 1204, $X_P$, $Y_P$ (which are defined relative to the origin of the microtile) and x and y subsample positions within the pixel 1206, $X_S$, $Y_S$ (which are defined relative to the origin of the pixel), where: $(X,Y)=(X_{UT}+X_P+X_S, Y_{UT}+Y_P+Y_S)$.

The set of x and y offsets for the plurality of microtiles 1204 relative to the tile origin 1210 are the same for all tiles, because each tile is subdivided in the same way into microtiles. Similarly, the set of x and y offsets for the plurality of pixels 1206 relative to the microtile origin (which again may be defined to be the top left corner) are the same for all microtiles (in any tile). The set of x and y subsample positions within a pixel, as defined relative to the pixel origin (which again may be defined to be the top left corner), may be the same for all pixels (in any microtile and any tile) and in various examples there may only be a single subsample position per pixel.

As described in detail below and shown in FIG. 13A, the edge calculation hardware 1102-1104 may each divide up the hardware that performs the calculations into a plurality of sub-units which each calculate a part of the result:

One or more microtile component hardware elements 1302 that calculate the microtile component(s) of the function, f(x,y), being calculated by the edge calculation hardware;

One or more pixel component hardware elements 1304 that calculate the pixel position component(s) of the function, f(x,y), being calculated by the edge calculation hardware; and None, one or more subsample component hardware elements 1306 that calculate the subsample position components of the function, f(x,y), being calculated by the edge calculation hardware.

A plurality of adders (e.g. in the form of an addition and comparison element 1308) may be used to combine the outputs from the hardware elements in different combinations (such that each component may be reused in a plurality of different combinations) to generate a plurality of output results for different subsamples and/or different pixels (e.g. where there is a single subsample per pixel). As described above, an edge test involves a comparison and hence each output result may, in some examples, only be the sign of the SOP value (e.g. a single bit), although the full result (comprising all the bits of the SOP value) may be output in other examples.

In addition to using adders to combine the outputs from the hardware elements, the edge calculation hardware may further comprise one or more multiplexers 1310 to select the outputs which are input to an adder (and hence gate out any outputs that are not required) and this enables the hardware to be reconfigurable and be used for more than one type of calculation (e.g. for both conservative rasterization and line rasterization). In addition, the inclusion of multiplexers to select outputs which are input to an adder enables the hardware described herein to be configured for a variable number of pixels and/or samples (e.g. to enable support for different anti-aliasing modes).

The particular component results, as generated by the separate hardware components (i.e. the microtile component hardware elements, the pixel component hardware elements and the subsample component hardware elements) are re-used for multiple output results. This leads to a reduction in the hardware size (e.g. area) and power consumption (e.g. compared to computing each full SOP independently) and enables multiple results to be generated in parallel. Additionally, by structuring the hardware as described herein, it scales well, i.e. it can be easily extended to more modes and more output samples.

Figure 13A:
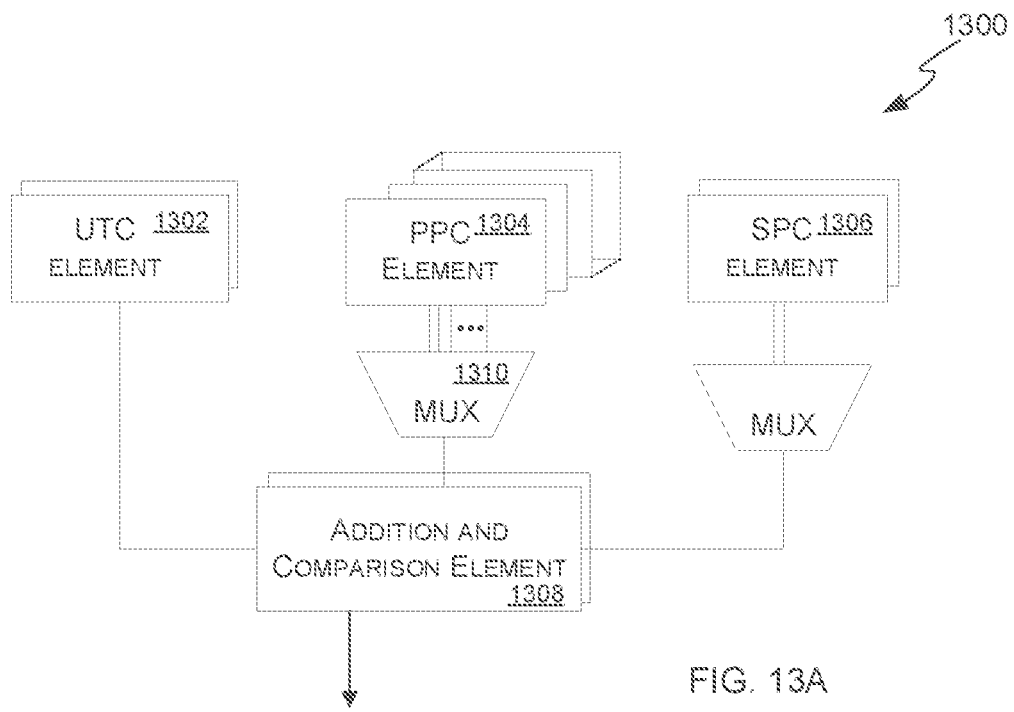
FIG. 13A is a schematic diagram of example edge test hardware 1300 that may be used both to perform conservative rasterization and the line rasterization method of FIG. 3.

The example hardware arrangement 1300, shown in FIG. 13A, comprises two microtile component hardware elements 1302, a plurality of pixel component hardware elements 1304, two subsample component hardware elements 1306 and a plurality of addition and comparison elements (which may, for example, be implemented as a plurality of adders) 1308, with each addition and comparison element 1308 generating a separate output result (i.e. from a different combination of inputs from the various inputs, e.g. for a different sample position within the same microtile). Where the hardware arrangement 1300 is used for conservative rasterization there may be at least 25 pixel component hardware elements 1304, i.e. at least one for each corner of a pixel in a microtile, and at least 25 addition and comparison elements (which may, for example, be implemented as a plurality of adders) 1308, with each addition and comparison element 1308 generating an output result for a different pixel corner within the same microtile.

The hardware arrangement 1300 may additionally comprise one or more multiplexers 1310 that connect the pixel component hardware elements 1304, subsample component hardware elements 1306 and optionally the microtile component hardware elements 1302 to the addition and comparison elements 1308. In examples that include multiplexers 1310, one or more select signals control the operation of the multiplexers 1310 and in particular control which combination of the hardware elements 1302, 1304, 1306 are connected to each particular addition and comparison element 1308.

The hardware arrangement 1300 shown in FIG. 13A is configured to operate as the edge test hardware B 1103 in FIG. 11B and hence is configured to perform the first three tests of the method of FIG. 3. The other instances of edge test hardware in FIG. 11B may comprise a similar arrangement of hardware logic blocks as shown in FIG. 13A, but the numbers of each of the microtile component hardware elements 1302, pixel component hardware elements 1304 and subsample component hardware elements 1306 may differ. For example, in edge test hardware A 1102 (which is arranged to perform the fourth, fifth and sixth tests of the method of FIG. 3), there may be only one microtile component hardware element 1302, a plurality of pixel component hardware elements 1304 (e.g. at least 25) and a plurality of subsample component hardware elements 1306 (e.g. at least four).

If, as described above, the edge test hardware 1300 evaluates a SOP of the form:

$$f(x,y) = \alpha x + \beta y + \gamma$$

where the values of the coefficients α, β, γ may be different for each SOP evaluated, then the microtile component hardware element 1302 evaluates:

$$f_{UT}(x_{UT}, y_{UT}) = \alpha x_{UT} + \beta y_{UT} + \gamma$$

For all instances of edge test hardware 1102-1104 when used for conservative rasterization and edge test hardware A 1102 when used for line rasterization, values of $x_{UT}$ and $y_{UT}$ are the microtile coordinates relative to the tile origin 1210 and differ for different microtiles. The microtile component hardware element 1302 may receive, as inputs, the values of α, β, γ, $x_{UT}$ and $y_{UT}$ and the element outputs a single result $f_{UT}$. For conservative rasterization, the values of α, β, γ are the coefficients of the particular primitive edge (shown as Ax,Bx,Cx in FIGS. 11A and 11B, where x=[0,3]) and for edge test hardware A 1102 when used for line rasterization, the values of α, β, γ are the coefficients of the line being rasterised (shown as A,B,C in FIG. 11B). The values of the inputs for edge test hardware B when used for line rasterization are described below.

The pixel component hardware elements 1304 evaluate:

$$f_P(x_P, y_P) = \alpha x_P + \beta y_P$$

for different values of $x_P$ and $y_P$. For all instances of edge test hardware 1102-1104 when used for conservative rasterization these values differ for different pixel corners within a microtile. In these cases, the set of values of $x_P$ and $y_P$ (i.e. the values of $x_P$ and $y_P$ for all pixel corners within a microtile, as defined relative to the microtile origin) is the same for all microtiles and they may, for example, be calculated by the edge test hardware 1300 or may be accessed from a look-up table (LUT). In various examples, the origin of a microtile may be defined as the top left corner of each microtile and the values of $x_P$ and $y_P$ may be integers and so the determination of the values requires little or no computation (and hence this provides an efficient implementation). Referring back to the example shown in FIG. 12A, where each microtile comprises four rows of four pixels and hence there are five rows of five pixel corners 1212 as shown in FIG. 12B, then the set of values of $x_P$ is {0, 1, 2, 3, 4} (which may also be written as [0,4]) and the set values of $y_P$ is {0, 1, 2, 3, 4} (which may also be written [0,4]). Each pixel component hardware element 1304 receives as input A and B and may also receive the set of values of $x_P$ and $y_P$ (e.g. in examples where these are not integers). Each element 1304 outputs a single result $f_P$ and consequently the calculation of $f_P$ may be merged with any calculations that are performed to determine $x_P$ and/or $y_P$. The values of the inputs for edge test hardware B when used for line rasterization are described below.

The subsample component hardware element 1306, where provided, evaluates:

$$f_S(x_S, y_S) = \alpha x_S + \beta y_S$$

For instances of edge test hardware 1102-1104 when used for conservative rasterization where there is only a single subsample position per pixel and there is only a single value of $x_S$ and $y_S$, there is only one value of $f_S$ and the value of $f_S$ may be set to zero. The values of the inputs for edge test hardware B when used for line rasterization are described below.

For all instances of edge test hardware 1102-1104 when used for conservative rasterization and edge test hardware A 1102 when used for line rasterization, the addition and comparison elements 1308 evaluate:

$$f(x,y) = f_{UT} + f_P + f_S$$

and for edge test hardware B when used for line rasterization or for evaluating two parallel primitive edges in conservative rasterisation, the addition and comparison elements 1308 also evaluate:

$$f(x,y) = f_{UT} - f_P - f_S$$

Each addition and comparison element 1308 combines a different combination of $f_{UT}$, $f_P$ and $f_S$ values (where the particular combination of values are provided as inputs to the addition and comparison unit 1308) and the combination is either fixed (i.e. hardwired between the elements) or is selected by one or more multiplexers 1310 (where provided). To perform an edge test only the MSB (or sign-bit) of the result (i.e. of f(x,y)) may be output and hence in such examples the full result does not need to be calculated by the addition and comparison element 1308 and the addition and comparison element 1308 may perform a comparison rather than an addition (which reduces the overall area of the hardware). This MSB indicates the sign of the result (because a>b===sign (b−a)) and, as described above, this indicates whether the pixel corner is to the left or right of the edge. In other examples, the full result may be generated and output.

Where the hardware arrangement 1300 is used for conservative rasterization, edge test results corresponding to the four corners of a pixel that are output by the hardware arrangement 1300 for a particular primitive edge are combined using an OR logic function to determine an outer coverage result and an AND logic function to determine an inner coverage results. These inner and outer coverage results for the same pixel are combined with corresponding results for the same pixel generated by other such hardware arrangements that calculate SOPs for different primitive edges (i.e. the other instances of edge test hardware as shown in FIGS. 11A and 11B), using an AND logic function 1106 to generate the outer and inner coverage results for a primitive and a particular pixel.

Where the hardware arrangement 1300 is used for edge test hardware B 1103 for line rasterization, a first subsample component hardware element 1306, which calculates $f_S(x_S, y_S) = \alpha x_S + \beta y_S$, may be used to calculate $f_{901}(x_{start}, y_{start})$ and $f_{901}(x_{end}, y_{end})$ by inputting α=−0.5 and β=+0.5 along with $x_{start}, y_{start}$ and $x_{end}, y_{end}$. This first subsample component hardware element 1306 therefore corresponds to one of the second SOP hardware logic units 1004 in the hardware arrangement of FIG. 10. A second subsample component hardware element 1306 may be used to calculate $f_{903}(x_{start}, y_{start})$ and end, $f_{903}(x_{end}, y_{end})$ by inputting α=−0.5 and β=−0.5 along with $x_{start}, y_{start}$ and $x_{end}, y_{end}$. and hence corresponds to the other of the second SOP hardware logic units 1004 in the hardware arrangement of FIG. 10. As for line rasterization the x, y coordinates for the start and end of the line being rasterised are high precision, unlike the subsample coordinates (e.g. when the hardware is used for edge calculations as part of conservative rasterization or in edge test hardware A for line rasterisation), when inputting values to the subsample component hardware element 1306, the values of α and β may be implicit constants (replacing the subsample locations) whilst the values of $x_{start}, y_{start}$ and $x_{end}, y_{end}$ are input instead of the a, b coefficients in subsample calculations for conservative rasterization.

In various examples, conservative rasterization may not use subsample component hardware elements and hence these may be only used for line rasterization or they may be used for both line rasterization and conservative rasterization but when used for conservative rasterization, the inputs may be provided such that $f_S(x_S, y_S)=0$, e.g. $x_S=y_S=0$ or α=β=0. Furthermore as multiplying by ±0.5 does not require any multiplication, the subsample component hardware elements, where used in edge test hardware B 1103 for line rasterization only, may be implemented using a small number of addition and subtraction logic elements.

In edge test hardware B 1103 for line rasterization, the two microtile component hardware elements 1302 may be used to calculate g and −g and the pixel component hardware elements 1304 may be used to calculate ih. In order to calculate the values of ih, the pixel component hardware elements 1304, which calculate $f_P(x_P, y_P)=\alpha x_P+\beta y_P$, may receive as inputs α=2, β=−0.5, a set of values of $x_P$ which is {0, 1, 2} (which may also be written as [0,3]) and a set values of $y_P$ which is also {0, 1, 2, 3}.

Figure 13B:
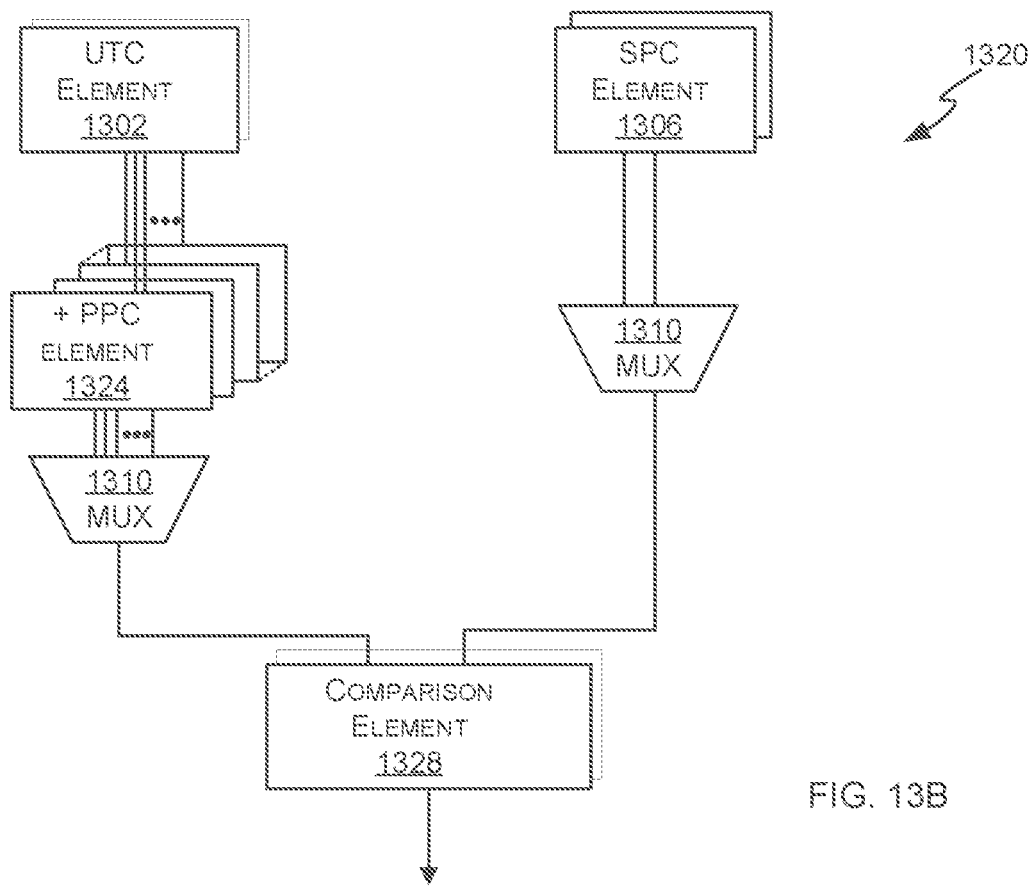
FIG. 13B is a schematic diagram of another example edge test hardware that may be used both to perform conservative rasterization and the line rasterization method of FIG. 3.

The second example hardware arrangement 1320, shown in FIG. 13B, is a variation on the hardware arrangement 1300 shown in FIG. 13A. This second example hardware arrangement 1320 comprises two single microtile component hardware elements 1202, a plurality of pixel component hardware elements 1324 (although these operate slightly differently to those shown in FIG. 13A and described above), one or more subsample component elements 1306 and a plurality of comparison elements (which may, for example, be implemented as a plurality of adders) 1328 (although these operate slightly differently to the addition and comparison elements 1308 shown in FIG. 13A and described above), with each comparison element 1328 generating an output result. Like the hardware arrangement 1300 shown in FIG. 13A, the hardware arrangement 1320 shown in FIG. 13B may additionally comprise one or more multiplexers 1310 controlled by select signals.

The microtile component hardware elements 1302 in FIG. 13B operate as described above with reference to FIG. 13A; however, instead of the output being fed directly into the comparison element 1328 (as shown in FIG. 13A), in the arrangement 1320 of FIG. 13B, the output of the microtile component hardware elements 1302 are input to each of the plurality of pixel component hardware elements 1324. The pixel component hardware elements 1324 in the arrangement 1320 of FIG. 13B do not operate in the same way as those shown in FIG. 13A. They receive as input (in addition to A and B) the output from the microtile component hardware element 1302, $f_{UT}$, and evaluate:

$$f_{UT}(x_{UT}, y_{UT}) + f_P(x_P, y_P) = f_{UT}(x_{UT}, y_{UT}) + \alpha x_P + \beta y_P$$

and for edge test hardware B when used for line rasterization or for evaluating two parallel primitive edges in conservative rasterisation, the pixel component hardware elements 1324 also evaluate:

$$f_{UT}(x_{UT}, y_{UT}) - f_P(x_P, y_P) = f_{UT}(x_{UT}, y_{UT}) - \alpha x_P - \beta y_P$$

As described above (with reference to FIG. 13A) for all instances of edge test hardware used for conservative rasterization and edge test hardware A used for line rasterisation, the values of $x_P$ and $y_P$ (i.e. the values of $x_P$ and $y_P$ for all pixel corners within a microtile, as defined relative to the microtile origin) may be integers and hence the pixel component hardware elements 1324 may comprise an arrangement of adders to add the appropriate multiples of α and/or β to the input value generated by the microtile component hardware element, $f_{UT}$, 1302 and this may be implemented without using any multipliers and this reduces the size and/or power consumption of the pixel component hardware elements 1324. Each element 1324 outputs a single result $f_{UT}+f_P$ or $f_{UT}-f_P$ and as described above, the calculation of $f_P$ and hence the calculation of the single result may be merged with any calculations that are performed to determine $x_P$ and/or $y_P$.

The comparison elements 1328 evaluate:

$$f(x, y) = f_{UT} + f_P + f_S$$

and for edge test hardware B when used for line rasterization or for evaluating two parallel primitive edges in conservative rasterisation, the comparison elements 1328 also evaluate:

$$f(x, y) = f_{UT} - f_P - f_S$$

in a similar manner to the addition and comparison elements 1308 described above; however the inputs are different since the values of $f_{UT}$ and $f_P$ have already been combined in the pixel component hardware elements 1324. Each comparison element 1328 combines a different combination of $(f_{UT} \pm f_P)$ and $f_S$ values (where the particular combinations of values are provided as inputs to the comparison units 1328) and the combination is either fixed (i.e. hardwired) or is selected by one or more multiplexers 1210 (where provided). To perform an edge test only the MSB (or sign-bit) of the result (i.e. of f(x,y)) may be output and hence the full result does not need to be calculated by the comparison elements 1328. This MSB indicates the sign of the result and, as described above, this indicates whether the subsample position is to the left or right of the edge. In other examples, the full result may be calculated and output.

The hardware arrangement 1320 shown in FIG. 13B may utilize the fact that the value of $f_P$ can be calculated quickly or alternatively the microtile calculation may be performed in the previous pipeline stage. By using this arrangement 1320 the overall area of the hardware arrangement may be reduced compared to the arrangement 1300 shown in FIG. 13A (e.g. the comparison elements 1328 may be smaller than addition and comparison elements 1308); however, each of the results output by the pixel component hardware elements 1324 comprises more bits (e.g. approximately 15 more bits for conservative rasterisation) than in the arrangement 1300 shown in FIG. 13A.

Where the hardware arrangement 1320 is used for conservative rasterization, and in the same way as described above with reference to FIG. 13A, edge test results output from the hardware arrangement 1320 corresponding to the four corners of a pixel are combined using an OR logic function to determine an outer coverage result and an AND logic function to determine an inner coverage results. These inner and outer coverage results for the same pixel are combined with corresponding results for the same pixel generated by other such hardware arrangements that calculate SOPs for different primitive edges (i.e. the other instances of edge test hardware as shown in FIGS. 11A and 11B), using an AND logic function 1106 to generate the outer and inner coverage results for a primitive and a particular pixel.

In a similar manner to the hardware arrangement 1300, where the hardware arrangement 1320 is used for line rasterization, a first subsample component hardware element 1306 may be used to calculate $f_{901}(x_{start}, y_{start})$ and $f_{901}(x_{end}, y_{end})$ and hence corresponds to one of the second SOP hardware logic units 1004 in the hardware arrangement of FIG. 10. A second subsample component hardware element 1306 may be used to calculate $f_{903}(x_{start}, y_{start})$ and $f_{903}(x_{end}, y_{end})$ and hence corresponds to the other of the second SOP hardware logic units 1004 in the hardware arrangement of FIG. 10. The microtile component hardware element 1302 may be used to calculate g and –g and the pixel component hardware elements 1324 may be used to calculate ih such that the combined constants g+h or –g–h are generated and input to the comparison element 1328.

By using the same hardware to perform both conservative rasterization (or any other process involving multiple edge calculations performed in the rasterization phase) and line rasterization, the overall size and power consumption of the rasterization phase 204 is reduced, or described in a different way, line rasterization functionality can be added to the rasterization hardware with only a small increase in size and power consumption. Additionally the line rasterization can be processed in the same logic path as triangle primitives, and as a result the surrounding hardware logic blocks do not need to be changed to support line rasterization. Furthermore, when evaluating the same end points (e.g. start and end points of the line) for multiple microtiles only a few bits will change (e.g. in the microtile component hardware elements and/or subsample component hardware elements). This means that evaluating the line for multiple microtiles in a row can be done with fairly minimal power.

The inputs used by the hardware for the first, second and third tests of the method of FIG. 3 are very different in nature to the inputs used for conservative rasterization. For conservative rasterization (and the fourth, fifth and sixth tests of the line rasterization method), the edges are variable (because they correspond to primitive edges) and the sample positions are fixed; whereas for the first, second and third tests of the line rasterization method, the sample positions are variable (as they are the start and end points of the line being rasterized) and the edges are fixed (as they correspond to extended diamond edges which are defined by pixel positions).

In the examples described above, particular calculations are described as being implemented in particular logic elements (e.g. in the arrangements shown in FIGS. 13A and 13B). It will be appreciated, however, that in other examples, some of the calculations may be performed in different logic elements to those described.

In the examples described above, various combinations of coefficients are provided (e.g. values of a, b, c and A, B, C, etc.). It will be appreciated that the particular coefficients are provided by way of example and other combinations may alternatively be used (e.g. the combinations of coefficients provided herein may be scaled to provide further combinations of coefficients that may be used).

In the examples described above, the first and second tests (blocks 306, 308) in FIG. 3 are performed using edge tests on the extended diamond edges (e.g. as shown in FIG. 7). In other examples, however, these tests may be implemented in a different way. For example, the x and y deltas between the pixel centre (marked with an X in FIG. 1) and the start/end point coordinates. The signs of the deltas may be used to evaluate the precise on-edge/corner conditions. In comparison to the method described above, using signs of deltas requires new logic and cannot reuse logic that can also be used for conservative rasterization.

FIG. 14 shows a computer system in which the graphics processing systems described herein may be implemented. The computer system comprises a CPU 1402, a GPU 1404, a memory 1406 and other devices 1414, such as a display 1416, speakers 1418 and a camera 1420. The GPU 1404 comprises line rasterization hardware 1422 and this may comprise a hardware arrangement as described above and shown in any of FIGS. 7, 10, 11 and 13. The components of the computer system can communicate with each other via a communications bus 1424. Where LUTs (e.g. as shown in FIG. 10) are used by the line rasterization hardware 1422, these may be stored within the GPU 1404 or in the memory 1406

The hardware of FIGS. 2, 7, 10, 11A, 11B, 13A, 13B and 14 are shown as comprising a number of functional blocks. This is schematic only and is not intended to define a strict division between different logic elements of such entities. Each functional block may be provided in any suitable manner. It is to be understood that intermediate values described herein as being formed by a particular logic block need not be physically generated by that logic block at any point and may merely represent logical values which conveniently describe the processing performed by the hardware arrangement between its input and output.

The line rasterization hardware described herein may be embodied in hardware on an integrated circuit. The line rasterization hardware described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

Therefore, there may be provided a method of manufacturing, at an integrated circuit manufacturing system, line rasterization hardware as described herein. Furthermore, there may be provided an integrated circuit definition dataset that, when processed in an integrated circuit manufacturing system, causes the method of manufacturing line rasterization hardware to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture line rasterization hardware will now be described with respect to FIG. 15.

FIG. 15 shows an example of an integrated circuit (IC) manufacturing system 1502 which is configured to manufacture line rasterization hardware as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining line rasterization hardware as described in any of the examples herein), process the IC definition dataset, and generate an IC according to the IC definition dataset (e.g. which embodies line rasterization hardware as described in any of the examples herein). The processing of the IC definition dataset configures the IC manufacturing system 1502 to manufacture an integrated circuit embodying line rasterization hardware as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture line rasterization hardware without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of rasterising a line in a graphics processing pipeline, the line having a start point and an end point, the method comprising, for a pixel:
   determining whether:
   a) an extended line passing through the start and end points of the line has a slope less than −1 or greater than +1 and touches the right point of a diamond test area within the pixel;
   b) the extended line touches the bottom point of the diamond test area;
   c) the extended line is not on a same side of each point of the diamond test area; and
   in response to determining that at least one of a), b) or c) is true, adding the pixel to be drawn as part of the line.

2. The method according to claim 1, further comprising: rasterizing the line using those pixels to be drawn as part of the line.

3. The method according to claim 1, further comprising: receiving, as inputs, coefficients of the extended line, and wherein:
   determining that at least one of a), b) or c) is true is based on the coefficients of the extended line.

4. The method according to claim 1, further comprising: calculating coefficients of the extended line based on coordinates of the start point and the end point, and wherein:
   determining that at least one of a), b) or c) is true is based on the coefficients of the extended line.

5. The method according to claim 1, further comprising: generating, for each pixel, a first set of edge test results, the first set of edge test results comprising edge test results for each extended diamond edge of the diamond test area within the pixel and for sample positions at each of the start point and end point of the line, wherein an extended diamond edge is coincident with an edge of the diamond test area and extends beyond the diamond points that the edge connects and wherein an edge test result for an edge and a sample position indicates whether the sample position is to the left of the edge or to the right of the edge or exactly on the edge; and
   generating a second set of edge test results, the second set of edge test results comprising edge test results for the line and for sample positions corresponding to each point of each diamond test area for each pixel;
   wherein determining if the extended line passing through the start and end point has a slope less than −1 or greater than +1 and touches the right point of the diamond test area comprises:
   receiving a first subset of the second set of edge test results and determining from the results in the first subset and for each pixel, if the extended line has a slope less than −1 or greater than +1 and touches the right point of the diamond test area;
   wherein determining if the extended line touches the bottom point of the diamond test area comprises:
   receiving a second subset of the second set of edge test results and determining from the results in the second subset and for each pixel, if the extended line touches the bottom point of the diamond test area; and
   wherein determining if the extended line is on a same side of each point of the diamond test area comprises:
   receiving a third subset of the second set of edge test results and determining from the results in the third subset and for each pixel, if the extended line is on a same side of each point of the diamond test area.

6. The method according to claim 5, wherein the extended diamond edges of the diamond test area within a pixel comprise two pairs of parallel edges and generating, for each pixel, the first set of edge test results, comprises:
   generating an edge test results for a first edge in each pair of parallel edges and for sample positions at each of the start point and end point of the line; and
   calculating edge test results for a second edge in each pair of parallel edges by inverting the results for the first edges in each pair and adding a constant to each inverted result.

7. The method according to claim 5, wherein the method is implemented substantially in parallel for each pixel in an input set of pixels and wherein generating a second set of edge test results, the second set of edge test results comprising edge test results for the line and for sample positions corresponding to each point of each diamond test area for each pixel comprises:
   generating a second set of edge test results, the second set of edge test results comprising edge test results for the line and for sample positions corresponding to each point of each diamond test area for each pixel in the input set of pixels.

8. The method according to claim 1, further comprising:
   in response to determining that (a) the extended line does not both touch the right point of the diamond test area and have a slope less than −1 or greater than +1, (b) that the extended line does not touch the bottom point of the diamond test area, and (c) that the extended line is on a same side of each point of the diamond test area, not including the pixel as part of the line when rasterizing the line.

9. The method according to claim 1, further comprising, for each pixel to be drawn as part of the line:
   determining whether the pixel is inside a bounding box of the line; and
   in response to determining that the pixel is outside the bounding box of the line, removing the pixel from the pixels to be drawn as part of the line.

10. The method according to claim 1, further comprising, for each pixel in the pixels to be drawn as part of the line:
  generating a bounding box of the line; and
  generating the input pixels by adding to an input set of pixels, each pixel in the bounding box of the line.

11. The method of claim 1, wherein the determining is performed in response to the start and end points being outside the diamond test area.

12. A graphics processing pipeline comprising a rasterization phase for a line having a start point and an end point, the rasterization phase comprising hardware logic arranged to, for each pixel:
  a) determine whether an extended line passing through the start and end points of the line has a slope less than −1 or greater than +1 and touches the right point of a diamond test area within the pixel;
  b) determine whether the extended line touches the bottom point of the diamond test area;
  c) determine whether the extended line is not on a same side of each point of the diamond test area; and
  in response to determining that at least one of a), b) or c) is true, add the pixel to be drawn as part of the line.

13. The graphics processing pipeline according to claim 12, wherein the hardware logic comprises:
  first edge test hardware logic arranged to generate, for each pixel, edge test results for each extended diamond edge of a diamond test area within the pixel and for sample positions at each of the start point and end point of the line, wherein an extended diamond edge is coincident with an edge of the diamond test area and extends beyond the diamond points that the edge connects and wherein an edge test result for an edge and a sample position indicates whether the sample position is to the left of the edge or to the right of the edge or exactly on the edge;
  second edge test hardware logic arranged to generate edge test results for the line and for sample positions corresponding to each point of each diamond test area for each pixel;
  first test hardware logic arranged to receive a first subset of the edge test results from the first edge test hardware logic and to determine from the received results and for a pixel, if the end point of the line is in the diamond test area within the pixel;
  second test hardware logic arranged to receive a first subset of the edge test results from the second edge test hardware logic, to determine from the received results and for each pixel, if the extended line has a slope less than −1 or greater than +1 and touches the right point of the diamond test area and to output a result indicating whether the extended line has a slope less than-1 or greater than +1 and touches the right point of the diamond test area;
  third test hardware logic arranged to receive a second subset of the edge test results from the second edge test hardware logic, to determine from the received results and for each pixel, if the extended line touches the bottom point of the diamond test area and to output a result indicating whether the extended line touches the bottom point of the diamond test area;
  fourth test hardware logic arranged to receive a third subset of the edge test results from the second edge test hardware logic, to determine from the received results and for each pixel, if the extended line is on a same side of each point of the diamond test area and to output a result indicating whether the extended line is on a same side of each point of the diamond test area; and
  further hardware logic arranged to receive outputs from the second, third and fourth test hardware logic and to determine from the outputs and for each pixel, if the extended line has a slope less than −1 or greater than +1 and touches the right point of the diamond test area or that the extended line touches the bottom point of the diamond test area or that the extended line is not on a same side of each point of the diamond test area and in response to determining that an extended line passing through the start and end point is on a lower-left or lower-right edge of the diamond test area or that the extended line has a slope less than −1 or greater than +1 and touches the right point of the diamond test area or that the extended line touches the bottom point of the diamond test area or that the extended line is not on a same side of each point of the diamond test area, to add the pixel to be drawn as part of the line.

14. The graphics processing pipeline according to claim 12, wherein the hardware logic is further arranged to perform normal or conservative rasterization.

15. The graphics processing pipeline according to claim 14, wherein the hardware logic comprises:
  a first instance of edge test hardware arranged, for normal or conservative rasterization, to perform edge test calculations in relation to a first edge of a primitive;
  a second instance of edge test hardware arranged, for normal or conservative rasterization, to perform edge test calculations in relation to a second edge of a primitive and for line rasterization to determine whether the end point and/or the start point of the line is in a diamond test area within the pixel, in response to determining that the end point is not in the diamond test area and the start point of the line is in the diamond test area, to add the pixel to be drawn as part of the line, and in response to determining that neither the start point nor the end point of the line are in the diamond test area, determine if the line crosses more than one extended diamond edge;
  a third instance of edge test hardware arranged, for normal or conservative rasterization, to perform edge test calculations in relation to a third edge of a primitive; and
  wherein either the first or third instance of edge test hardware is arranged, for line rasterization, in response to determining that the line crosses more than one extended diamond edge: to determine if an extended line passing through the start and end point has a slope less than −1 or greater than +1 and touches the right point of the diamond test area; to determine if the extended line touches the bottom point of the diamond test area; to determine if the extended line is on a same side of each point of the diamond test area; and in response to determining that the extended line has a slope less than −1 or greater than +1 and touches the right point of the diamond test area or that the extended line touches the bottom point of the diamond test area or that the extended line is not on a same side of each point of the diamond test area, to add the pixel to be drawn as part of the line.

16. The graphics processing pipeline according to claim 15, wherein the primitive is a parallelogram and the second instance of edge test hardware is arranged, for normal or conservative rasterization, to perform edge test calculations in relation to both the second edge of a primitive and a fourth edge of the primitive, wherein the second and fourth edges are parallel edges.

17. The graphics processing pipeline according to claim 12, wherein the hardware logic further comprises:

a hardware logic block comprising an input for receiving coordinates of the start point and the end point and hardware logic arranged to calculate coefficients of the extended line based on coordinates of the start point and the end point.

18. A non-transitory computer readable storage medium having stored thereon computer executable code that when executed causes a GPU to rasterize, for each pixel in an input set of pixels, a line having a start point and an end point, by:
   a) determining whether an extended line passing through the start and end points of the line has a slope less than −1 or greater than +1 and touches the right point of a diamond test area within the pixel;
   b) determining whether the extended line touches the bottom point of the diamond test area;
   c) determining whether the extended line is not on a same side of each point of the diamond test area; and
   in response to determining that at least one of a), b) or c) is true, adding the pixel to be drawn as part of the line.

* * * * *